(12) United States Patent
Hattori et al.

(10) Patent No.: US 8,385,085 B2
(45) Date of Patent: Feb. 26, 2013

(54) PWM SIGNAL GENERATOR, AND INVERTER EQUIPPED WITH THIS PWM SIGNAL GENERATOR

(75) Inventors: Nobuyuki Hattori, Osaka (JP); Yoshito Ohta, Kyoto (JP); Kenji Hirata, Nagaoka (JP)

(73) Assignees: Daihen Corporation, Osaka (JP); Kyoto University, Kyoto (JP); National University Corporation Nagaoka University of Technology, Niigata (JP)

( * ) Notice: Subject to any disclaimer, the term of this patent is extended or adjusted under 35 U.S.C. 154(b) by 403 days.

(21) Appl. No.: 12/678,632

(22) PCT Filed: Sep. 11, 2008

(86) PCT No.: PCT/JP2008/066399
§ 371 (c)(1),
(2), (4) Date: May 17, 2010

(87) PCT Pub. No.: WO2009/041276
PCT Pub. Date: Apr. 2, 2009

(65) Prior Publication Data
US 2010/0254172 A1    Oct. 7, 2010

(30) Foreign Application Priority Data

Sep. 25, 2007  (JP) .................................. 2007-247068

(51) Int. Cl.
*H02M 3/335* (2006.01)
*H02M 1/12* (2006.01)

(52) U.S. Cl. ................. 363/17; 363/40; 363/41; 363/98; 363/131; 363/132

(58) Field of Classification Search .................... 363/17, 363/40, 41, 98, 131, 132
See application file for complete search history.

(56) References Cited

U.S. PATENT DOCUMENTS

| 7,026,798 | B2 * | 4/2006 | Cheung et al. | 323/225 |
| 7,247,955 | B2 * | 7/2007 | Tracy et al. | 307/151 |
| 7,443,103 | B2 * | 10/2008 | Li et al. | 315/209 R |
| 7,595,615 | B2 * | 9/2009 | Li et al. | 323/277 |

(Continued)

FOREIGN PATENT DOCUMENTS

| JP | 2-146963 | 6/1990 |
| JP | 3-128677 | 5/1991 |

(Continued)

*Primary Examiner* — Bao Q Vu
(74) *Attorney, Agent, or Firm* — Hamre, Schumann, Mueller & Larson, P.C.

(57) ABSTRACT

The PWM signal generator of the present invention generates a first pulse waveform in which a first on-time $\Delta T_1$ calculated by a first on-time calculator (401) is used as an on-duration, and a second pulse waveform in which a second on-time $\Delta T_2$, calculated by a second on-time calculator (402) when a preset delay time has elapsed from the start of the calculation of the first on-time $\Delta T_1$, is used as an on-duration. Also, a PWM signal generator (413) generates a PWM signal on the basis of a composite pulse in which the generated first pulse waveform and second pulse waveform are combined, and the first on-time calculator (401) calculates the first on-time $\Delta T_1$ at the end of the composite pulse waveform.

15 Claims, 14 Drawing Sheets

| U.S. PATENT DOCUMENTS | | | | | FOREIGN PATENT DOCUMENTS | | |
|---|---|---|---|---|---|---|---|
| 2002/0118055 | A1* | 8/2002 | Simon et al. ................ 327/227 | JP | 11-53042 | 2/1999 |
| 2004/0222835 | A1* | 11/2004 | Simon et al. ................ 327/227 | JP | 2003-18859 | 1/2003 |
| 2005/0088156 | A1* | 4/2005 | Cheung et al. ............. 323/282 | JP | 2006-246673 | 9/2006 |
| 2006/0290292 | A1* | 12/2006 | Li et al. ...................... 315/194 | | | |
| 2008/0272752 | A1* | 11/2008 | Qiu et al. .................... 323/272 | | | |
| 2010/0085097 | A1* | 4/2010 | Bryant ........................ 327/175 | * cited by examiner | | |

PWM SIGNAL GENERATOR, AND INVERTER EQUIPPED WITH THIS PWM SIGNAL GENERATOR

TECHNICAL FIELD

This invention relates to a PWM signal generator that generates pulse waveforms and to an inverter device equipped with this PWM signal generator.

BACKGROUND ART

Conventionally, system-linked inverter devices have been developed with which power was supplied by linking DC power generated by a fuel cell, solar cell, or the like to a commercial power system. With this system-linked inverter device, a technique is proposed for reducing switching loss by reducing the number of times switching elements have to switch.

For example, Japanese Patent Application Laid-open No. H11-53042 discloses a technique for reducing switching loss by reducing the number of times switching elements have to switch in the region of practical use. Such reduction is achieved by setting the frequency of a triangular wave for generating a PWM (pulse width modulation) signal that controls the on/off operation of the switching elements to 20 kHz when the inverter output power Pout is not within a range of 30 to 80% of a rated value Pr, and changing the frequency of the triangular wave to a lower frequency (such as 15 kHz) when the inverter output power Pout is within a range of 30 to 80% of the rated value Pr.

Also, a method called current control by hysteresis is known as a method with which the number of times the switching elements have to be switched can be reduced more than with the method disclosed in Japanese Patent Application Laid-Open No. H11-53042.

This current control by hysteresis method involves generating a PWM signal by the method shown in FIG. 15, and controlling the on/off switching of the switching elements with this PWM signal.

In FIG. 15, the solid line curve A indicates the waveform of a control target value of a fundamental wave component of output current, while the dotted line curves AU and AD indicate the upper and lower limit waveforms within the allowable range when the fundamental wave component of the output current fluctuates. Also, the zigzag line B indicated by the one-dot chain line is the waveform of the current value outputted from an inverter device.

With current control by hysteresis, when the current value outputted from the inverter device rises to an upper limit value Iup of the allowable range ΔI, the level of the PWM signal is switched to the level at which the switching elements are controlled so that the supply of current power to the inverter is stopped (labeled "low level" in FIG. 15). On the contrary, when the current value outputted from the inverter device drops to a lower limit value Idown of the allowable range ΔI, the level of the PWM signal is switched to the level at which the switching elements are controlled so that current power is supplied to the inverter is stopped (labeled "high level" in FIG. 15).

Patent Document 1: Japanese Patent Application Laid-open No. H11-53042

Guidelines are proposed for linking a system-linked inverter device to a system. For instance, it is required to hold the effective value of the fundamental wave component (60 Hz in the Kansai area, and 50 Hz in the Kanto area) within a specific allowable range with respect to the output current, or to keep each of the fifth, seventh, and thirteenth order high-frequency components within 10 or less, and to keep them totally within 3% or less.

Examples of performance aspects generally required for an inverter device include higher output precision, faster response, and higher efficiency. Since the main object of a system-linked inverter device is to supply power to a system, unlike with an inverter device that is used to control a motor, the need for higher efficiency is given priority over higher output precision or faster response. Therefore, with a system-linked inverter device, on the condition that the above-mentioned guidelines be satisfied, it is preferable to increase efficiency by reducing as much as possible the number of times switching.

Current control by hysteresis is a method in which the current value outputted from a system-linked inverter device is kept as much as possible within an allowable range ΔI of the control target value (such as a control target value of ±3%) to lower the switching frequency of the switching elements and reduce switching loss. Therefore, from the standpoint of raising efficiency on the condition that guidelines be met, it is considered that current control by hysteresis is a PWM signal generation method that is more suited to a system-linked inverter device than the method described in Japanese Patent Application Laid-open No. H11-53042.

However, current control by hysteresis involves the following problems.

(1) A circuit is necessary to constantly monitor whether the AC current actually outputted from the system-linked inverter device departs from the allowable range or not.

(2) It is difficult to construct a unit in which a pattern of PWM signals is generated according to whether the AC current actually outputted from the system-linked inverter device departs from the allowable range, using a digital control system. Accordingly, good universality and flexibility cannot be taken advantage of in the design of the digital control system.

DISCLOSURE OF THE INVENTION

The present invention has been proposed under the above situation, and it is an object of the present invention to provide a PWM signal generator that solves the drawbacks to current control by hysteresis and which generates PWM signals with a longer period by means of a digitized control system, and an inverter device that is equipped with this PWM signal generator.

To solve the above-mentioned problems, the following technological means are employed in the present invention.

The PWM signal generator provided by a first aspect of the present invention comprises a first pulse waveform generator for generating a first pulse waveform; a second pulse waveform generator for generating a second pulse waveform when a preset delay time elapses after a start of generation of the first pulse waveform; and a PWM signal generator for generating a PWM signal based on a composite pulse waveform in which the first pulse waveform generated by the first pulse waveform generator is combined with the second pulse waveform generated by the second pulse waveform generator; wherein the first pulse waveform generator generates a next first pulse waveform at an end of the composite pulse waveform.

With this constitution, since a commercial power system is generated that has a longer period than the first pulse waveform generated by the first pulse waveform generation means, a PWM signal with a longer period can be generated.

In a preferred embodiment of the present invention, the first pulse waveform has a preset first pulse period, and becomes a high level in a middle portion of the first pulse period and becomes a low level at both ends of the first pulse period. The second pulse waveform has a preset second pulse period, and becomes a high level in a first part of the second pulse period and becomes a low level in a latter part of the second pulse period. The composite pulse waveform is a same type of waveform as the first pulse waveform constructed by connecting the second pulse waveform to a high level duration of the first pulse waveform.

In a preferred embodiment of the present invention, the first pulse period is equal to the second pulse period.

In a preferred embodiment of the present invention, the high level duration of the first pulse waveform is disposed in a middle of the first pulse period.

In a preferred embodiment of the present invention, the delay time satisfies a condition that the generation of the second pulse waveform starts in a duration in which the first pulse waveform generated by the first pulse waveform generator is a high level.

In a preferred embodiment of the present invention, the delay time is one-half of the first pulse period.

In a preferred embodiment of the present invention, the first pulse waveform generator includes: a first on-time calculator for computing, at a start of the first pulse period, a first on-time in which the first pulse waveform is to be a high level; and a first inversion timing decider for determining a first inversion timing at which a level of the first pulse waveform inverts from a low level to a high level in the first pulse period, based on the first on-time and a position of the high level in the first pulse period. The second pulse waveform generator includes: a second on-time calculator for computing, after a elapse of the delay time after a start of the first pulse period, a second on-time in which the second pulse waveform is to be at a high level; and a second inversion timing decider for determining, based on the second on-time, a second inversion timing at which a level of the second pulse waveform inverts from a high level to a low level in the second pulse period in which the second on-time has been computed. The PWM signal generation means includes: an inversion timing detector for detecting the first and second inversion timings with reference to a start timing of the first pulse period; and a PWM signal output unit for setting an output level to the low level at the start of the first pulse period, subsequently inverting the output level to the high level when the first inversion timing is detected, inverting thereafter the output level to the low level when the second inversion timing is detected, thereby generating a pulse signal in which the first pulse waveform and the second pulse waveform are combined, for outputting this pulse signal as the various pulses of the PWM signal.

In a preferred embodiment of the present invention, the first inversion timing decider determines, as the first inversion timing, a point when a remaining time, obtained by subtracting one-half of the computed first on-time from a time at the middle position of the high level in the first pulse period, has elapsed from a start of calculation of the first on-time, every time the first on-time is computed. The second inversion timing determination means determines, as the second inversion timing, a point when the computed second on-time has elapsed from a start of calculation of the second on-time, every time the second on-time is computed.

In a preferred embodiment of the present invention, the PWM signal generator further comprises: a determiner for determining whether the level of the second pulse waveform is a high level or not, every time a period of the first pulse waveform ends; and a pulse waveform regenerator for causing, only when the level of the second pulse waveform at an end of a period of the first pulse waveform is a high level, the second pulse waveform generator to generate a second pulse waveform again at an end of a period of the first pulse waveform. The PWM signal generator generates a PWM signal based on a composite pulse waveform in which the first pulse wave form is combined with the generated second pulse waveform and the regenerated second pulse waveform.

In a preferred embodiment of the present invention, the PWM signal generator further comprises: a second determiner for determining whether a level of the second pulse waveform regenerated at an end of a period of the previously generated second pulse waveform is a high level or not when the generation of the second pulse waveform is performed again by the pulse waveform regenerator. The pulse waveform regenerator repeats an operation of causing the second pulse waveform generator to generate a second pulse waveform again at an end of a period of the previously generated second pulse waveform, until a level of the second pulse waveform regenerated at an end of a period of the previously generated second pulse waveform reaches a low level. The PWM signal generator generates a PWM signal based on a composite pulse waveform in which the first pulse waveform is combined with the generated second pulse waveform and one or more regenerated second pulse waveforms.

In a preferred embodiment of the present invention, the first pulse waveform generator includes: a first-on time calculator for computing, at a start of the first pulse period, a first on-time in which the first pulse waveform is to be at a high level; and a first inversion timing decider for determining a first inversion timing at which a level of the first pulse waveform inverts from a low level to a high level in the first pulse period based on the first on-time and a position of a high level in the first pulse period. The second pulse waveform generator includes: a second on-time calculator for computing a second on-time in which the second pulse waveform is to be at a high level, after a elapse of the delay time from a start of the first pulse period, and if a generation of the second pulse waveform is performed again by the pulse waveform regenerator, at an end of the first pulse period and at an end of the period of the previously generated second pulse waveform; and a second inversion timing decider for determining, based on the second on-time that has been last computed by the second on-time calculator, a second inversion timing at which a level of the second pulse waveform inverts from a high level to a low level in the second pulse period in which the second on-time has been computed. The PWM signal generator includes: an inversion timing detector for detecting the first and second inversion timings with reference to a start time of the first pulse period; and a PWM signal output unit for setting an output level to a low level at a start of the first pulse period, subsequently inverting the output level to the high level when the first inversion timing is detected, holding the output level at the high level on the basis of the one or more generated second pulse waveforms, subsequently inverting the output level to the low level when the second inversion timing is detected, thereby generating a pulse signal in which the first pulse waveform and the one or more second pulse waveform are combined, for outputting this pulse signal as the various pulses of the PWM signal.

In a preferred embodiment of the present invention, the first inversion timing decider determines, as the first inversion timing, a point when the remaining time, obtained by subtracting one-half of the computed first on-time from the time at the middle position of the high level in the first pulse period, has elapsed from the start of calculation of the first on-time, every time the first on-time is computed. The second inversion timing decider determines, as the second inversion timing, a point when the second on-time last computed has elapsed from the start of the last calculation of the second on-time.

In a preferred embodiment of the present invention, the first on-time calculator computes the first on-time by using a first calculation formula for finding a solution to a first state equation in which an input variable is the first on-time of the first pulse waveform and which is derived from a state equation in which a state variable inputted to a control object is the first pulse waveform. The second on-time calculator computes the second on-time by using a second calculation formula for finding a solution to a second state equation in which an input variable is the second on-time of the second pulse waveform and which is derived from a state equation in which the state variable inputted to the control object is the second pulse waveform.

The inverter device provided by a second aspect of the present invention comprises a DC power supply that outputs DC voltage; a bridge circuit which inversely converts the DC voltage outputted from the DC power supply into AC voltage, and in which a plurality of switching elements are bridge-connected; a control circuit that controls the inverse conversion operation of the bridge circuit by controlling an on/off operation of the plurality of switching elements; a filter circuit that removes switching noise included in the AC voltage outputted from the bridge circuit; and a transformer that receives the AC voltage outputted from the filter circuit for applying a transformed voltage to a load; wherein the control circuit includes the PWM signal generator according to the first aspect, and controls an on/off operation of the plurality of switching elements by means of PWM signals generated by the PWM signal generator.

In a preferred embodiment of the present invention, the DC power supply comprises a solar cell, the bridge circuit comprises a three-phase bridge circuit, and the AC voltage outputted from the transformer is three-phase AC voltage outputted in connection with a commercial power system.

BRIEF DESCRIPTION OF THE DRAWINGS

FIG. 1 is a diagram of the circuit configuration according to an embodiment of a single-phase inverter device which the present invention relates to;

FIG. 12 is a diagram illustrating the circuit configuration according to an embodiment of the three-phase inverter device which the present invention relates to;

BEST MODE FOR CARRYING OUT THE INVENTION

Preferred embodiments of the present invention will be described with reference to the drawings.

Figure 1:
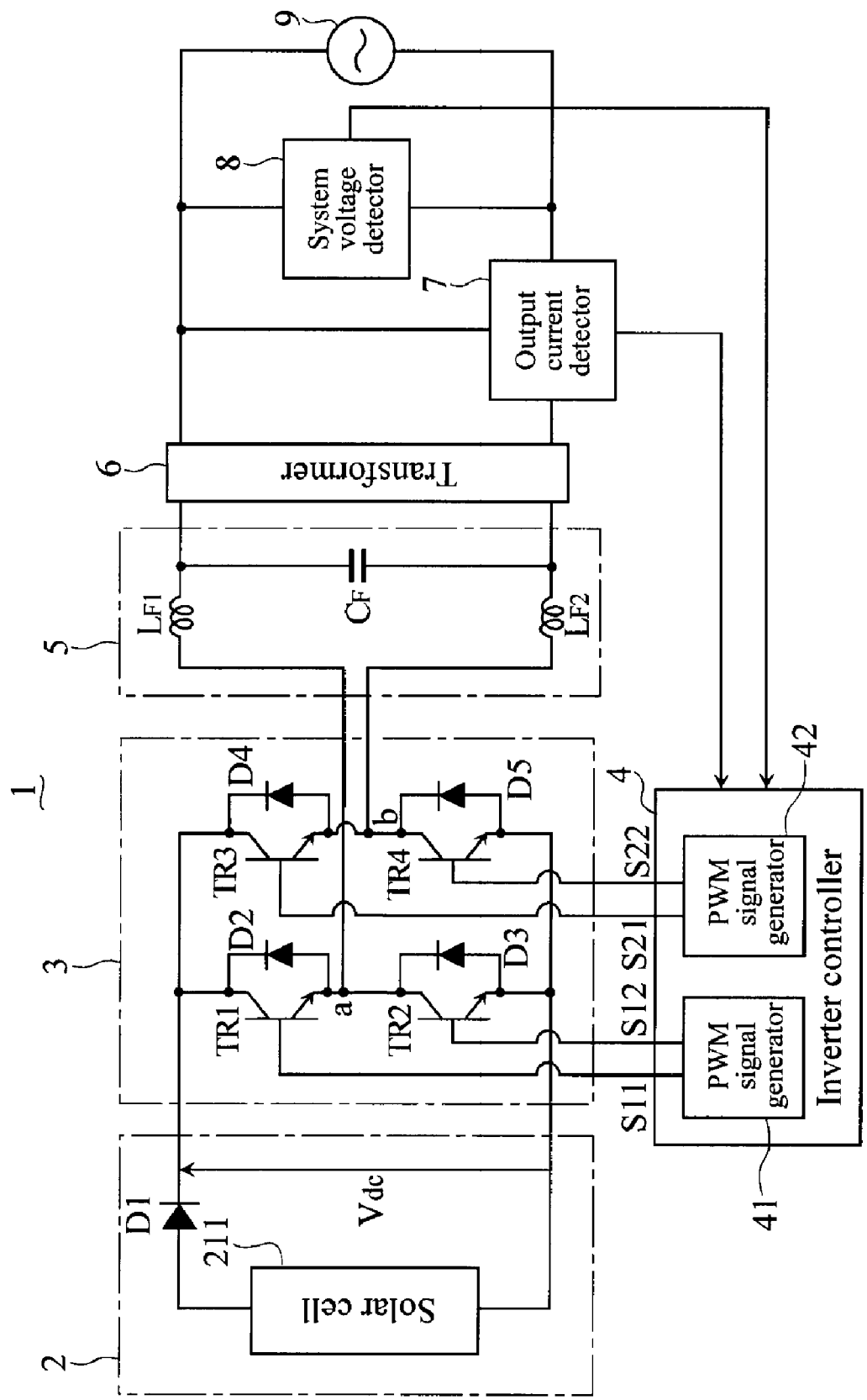

FIG. 1 is a diagram of the circuit configuration according to an embodiment of an inverter device which the present invention relates to. The inverter device 1 shown in the figure is a single-phase system-linked inverter device that supplies electric power based on DC power in connection with a commercial power system.

The inverter device 1 includes a DC power supply 2 that outputs DC power, an inverter circuit 3 that converts the DC power outputted from this DC power supply 2 into AC power, an inverter controller 4 that controls the on/off operation of switching elements TR1 to TR4 in this inverter circuit 3, a filter circuit 5 that removes switching noise included in the AC voltage outputted from the inverter circuit 3, a transformer 6 for combining the AC voltage outputted from the filter circuit 5 with system voltage for outputting the voltage to a system 9 (corresponds to the load with respect to the inverter device 1), an output current detector 7 that detects current outputted from the transformer 6 (hereinafter referred to as "output current"), and a system voltage detector 8 that detects the voltage of the system 9 (corresponds to the load with respect to the inverter device 1).

The inverter controller 4 controls the generated voltage from the inverter circuit 3, and thereby the inverter device controls the output current to conform with a target current for linking to the system. The inverter controller 4 converts the output current and the target current into output voltage and target voltage, and uses a signal generated by prescribed calculation using these voltages to control the generated voltage from the inverter circuit 3. A characteristic of the present invention is this calculation using the output voltage and target voltage at the inverter controller 4, so description of the processing in which the output current and target current are converted into output voltage and target voltage will be omitted below for the sake of simplicity.

The DC power supply 2 is provided with a solar cell 211 that converts solar energy into electrical energy. A diode D1 provided in an output line of the solar cell 211 serves to prevent backflow of current from the inverter circuit 3 to the solar cell 211.

The inverter circuit 3 is constituted of a voltage control type of inverter circuit. Specifically, the inverter circuit 3 includes four switching elements TR1 to TR4 in bridge connection. The switching elements TR1, TR2, TR3, and TR4 are connected in parallel to feedback diodes D2, D3, D4, and D5, respectively. These switching elements can be, for example, bipolar transistors, field effect transistors, thyristors, or other such semiconductor switching elements, and FIG. 1 shows an example of using transistors.

DC voltage Vdc outputted from the DC power supply 2 is supplied to both ends of the serial connection of the switching element TR1 and the switching element TR2 and the serial connection of the switching element TR3 and the switching element TR4, and AC voltage converted by the inverter circuit 3 is outputted from the connection point a between the switching element TR1 and the switching element TR2 and the connection point b between the switching element TR3 and the switching element TR4.

The on/off operation of the four switching elements TR1 to TR4 is controlled by PWM signals outputted from the inverter controller 4. Specifically, two pairs of PWM signals with different pulse widths are outputted from the inverter controller 4, where one pair is constituted of two PWM signals with mutually inverted phases. When the PWM signals of one pair are represented by S11 and S12, and the PWM signals of the other pair by S21 and S22, the PWM signals S11 and S12 are inputted to the control terminals (the base of the transistor in FIG. 1) of the switching element TR1 and the switching element TR2, respectively, while the PWM signals S21 and S22 are inputted to the control terminals (the base of the transistor in FIG. 1) of the switching element TR3 and the switching element TR4, respectively.

When the on state of the switching elements TR1 to TR4 is taken to be a "conductive state," and the off state is taken to be a "shutoff state," the serial connection of the switching element TR1 and the switching element TR2 of the inverter circuit 3 (hereinafter this circuit portion will be referred to as a "first arm") is such that the operating state is alternately repeated between a state of (TR1, TR2)=(on, off) and a state of (TR1, TR2)=(off, on). As is clear from the bridge connection in FIG. 1, the state of (TR1, TR2)=(on, off) is a circuit state in which DC power is supplied from the solar cell 211 to the inverter circuit 3, while the state of (TR1, TR2)=(on, off) is a circuit state in which the supply of DC power to the inverter circuit 3 is shut off.

Similarly, the serial connection of the switching element TR3 and the switching element TR4 (hereinafter this circuit portion will be referred to as a "second arm") is such that the operating state is alternately repeated between a state of (TR3, TR4)=(on, off) and a state of (TR3, TR4)=(off, on). The state of (TR3, TR4)=(on, off) is a circuit state in which DC power is supplied from the solar cell 211 to the inverter circuit 3, while the state of (TR3, TR4)=(off, on) is a circuit state in which the supply of DC power to the inverter circuit 3 is shut off.

The periods of the PWM signals S11 and S12 and the PWM signals S21 and S22 change, but these periods change in synchronization with each other, and only the duty ratios are mutually different. For example, at a given period, if the duty ratio of the PWM signals S11 and S12 is greater than the duty ratio of the PWM signals S21 and S22 (that is, if the on-duration of the PWM signal S11 is longer than the on-duration of the PWM signal S21), then the circuit state of (TR1, TR2)=(on, off) is longer than the circuit state of (TR3, TR4)=(on, off), so the voltage Va at the connection point a between the switching element TR1 and the switching element TR2 is higher than the voltage Vb at the connection point b between the switching element TR3 and the switching element TR4. In this case, with the connection point b being taken to be the voltage reference point (0 V), for example, then a voltage of (Va−Vb) (>0) is outputted from the inverter circuit 3.

Conversely, if the duty ratio of the PWM signals S11 and S12 is less than the duty ratio of the PWM signals S21 and S22, then the circuit state of (TR1, TR2)=(on, off) is shorter than the circuit state of (TR3, TR4)=(on, off), so the voltage Va at the connection point a is lower than the voltage Vb at the connection point b, and a voltage of (Va−Vb) (<0) is outputted from the inverter circuit 3.

Since the duty ratio of the PWM signals S11 and S12 and the duty ratio of the PWM signals S21 and S22 change continuously for every period, the voltage Vout that is outputted from the inverter circuit 3 and passes through the filter circuit 5 ends up varying in a sinusoidal shape.

The inverter controller 4, as discussed above, includes two PWM signal generators 41 and 42 corresponding to the first and second arms, and these PWM signal generators 41 and 42 generate the four PWM signals S11, S12, S21, and S22. The DC/AC conversion operation of the inverter circuit 3 is controlled by the PWM signals S11, S12, S21, and S22. The inverter controller 4 is mainly constituted of a microprocessor. The inverter controller 4 uses data about the output voltage converted from the output current inputted from the output current detector 7 to execute prescribed calculation with a preset program, and thereby calculates the on and off timing of the PWM signals S11 and S21, switches between the high and low levels in real time on the basis of this calculation result, and thereby generates the PWM signals S11 and S21. The inverter controller 4 also generates the PWM signals S12 and 822 by inverting the phase of these PWM signals S11 and S21. The method for generating the PWM signal S11 or the PWM signal S21 will be discussed below.

The filter circuit 5 is constituted of a low-pass filter in which two inductors $L_{F1}$ and $L_{F2}$ are respectively connected in series to a pair of output lines, and a capacitor $C_F$ is connected in parallel to the output side. In FIG. 1, the filter circuit 5 is represented as an balanced circuit, so the same inductors $L_{F1}$ and $L_{F2}$ are respectively connected in series to the pair of output lines, but if represented by an unbalanced circuit, then the inductors $L_F$ (that is, $L_{F1}+L_{F2}$) and the capacitor $C_F$ are connected in an inverted L shape.

The AC voltage outputted from the inverter circuit 3 contains switching noise of the switching elements TR1 to TR4 produced by the PWM signals, and to eliminate this switching noise, the cutoff frequency of the filter circuit 5 should be set to the lowest frequency of the PWM signals or further lower. However, as will be discussed below, since the period of the PWM signals pertaining to this embodiment is extended according to the circumstances, the lowest frequency cannot be specified. Therefore, a favorable frequency that is lower than the lowest frequency of the range that can be expected from experience (2 kHz, for example) and is higher than the frequency of the system voltage (50 or 60 Hz) is set as the cutoff frequency of the filter circuit 5.

The transformer 6 raises or lowers the AC voltage outputted from the filter circuit 5 (sinusoidal voltage) to substantially the same level as the system voltage. The output current detector 7 is provided on one of the pair of output lines of the transformer 6, and detects the AC current (output current) flowing to that output line. The system voltage detector 8 is provided between the two ends of the pair of output lines of the transformer 6, and detects the AC voltage (output voltage) outputted from those output lines. The output voltage of the inverter device 1 is controlled to so as to be substantially the same as the voltage of the system 9, so the voltage detected by the system voltage detector 8 can also be called the voltage of the system 9. The output current detected by the output current detector 7 is inputted to the inverter controller 4 and converted into output voltage, and is utilized to generate the PWM signals S11 and S21. The output voltage detected by the system voltage detector 8 is also inputted to the inverter controller 4, and is utilized to detect the phase.

Next, the method for generating PWM signals in the inverter controller 4 will be described.

The inverter device 1 is a system that includes the inverter circuit 3, which performs nonlinear operation, the filter circuit 5, and the transformer 6, which perform linear operation (that is, it is a mixed system of linear and nonlinear circuits). According to modern control theory, it is proposed that a digital control system be constructed by a method in which the control system is modeled as a linear system, a state equation that expresses this linear system model is produced, and a control value is found as the solution to this state equation.

With the present invention, attention is focused on the fact that the voltage inputted to the first linear circuit of the inverter device 1 is pulse voltage, and a PWM holding method is applied by presetting the period and waveform of the pulse voltage. Specifically, a time $T_{ON}$ at which the pulse voltage reaches the high level in a preset sampling duration T (hereinafter referred to as the "on-time") is termed a state variable, the control system of the inverter device 1 is expressed by a state equation based on the position of the high level duration of this on-time $T_{ON}$ (hereinafter referred to as the "on-duration"), and this state equation is converted into a state equation for a discrete time system and solved to find the on-time $T_{ON}$. This state equation and the method for solving it will be discussed below. A control system for the inverter device 1 (a control system that generates PWM signals) can be constructed as a digital control system by employing a method in which pulses of PWM signals are generated from the calculated on-time $T_{ON}$, the sampling duration T, and the position of the on-duration within the period.

With the above method, however, the sampling period T must be selected as the period T of the pulse voltage, and since this period T is fixed, the period of each PWM signal pulse cannot be varied. This is because if the on-time $T_{ON}$ is calculated at the start of the sampling period T, the state of the inverter system at the time of this calculation is assumed not to change within the sampling period T, and it is a premise that the sampling period T will be controlled with a pulse voltage having the on-duration of the calculated on-time $T_{ON}$.

In the present invention, the on-time $T_{ON}$ is calculated at the start of the sampling duration T, and the waveform of the pulse voltage is determined until the start of the next sampling duration T, but the on-time $T_{ON}$ is recalculated within the sampling duration T, and the timing at which the on-duration of the pulse voltage is ended (the off timing) is corrected. If the state has not changed within the sampling duration T, the off timing obtained from the recalculated on-time $T_{ON}$ (the corrected off timing) should be substantially the same as the off timing obtained from the initially calculated on-time $T_{ON}$ (the initial off timing), but if the state has changed within the sampling duration T, then the corrected off timing will differ from the initial off timing. Regardless of whether or to the corrected off timing changes with respect to the initial off timing, the previously determined pulse waveform is corrected by the pulse waveform determined by the recalculated on-time $T_{ON}$. Consequently, the period of each PWM signal pulse is longer than the sampling period T.

Pulse waveforms include the following.

(1) A waveform that is at the low level on both sides of one period, and at the high level in the middle portion (a type that is inverted to the high level midway through the period, and then returns to the low level; hereinafter referred to as "A type").

(2) A waveform that is at the high level in the first part of one period, and at the low level in the latter part (a type that is inverted to the high level at the start of the period, and is inverted to the low level in the middle of the period; hereinafter referred to as "B type").

(3) A waveform that is at the low level in the first part of one period, and at the high level in the latter part (a type that is inverted to the low level at the start of the period, and is inverted to the high level in the middle of the period; hereinafter referred to as "C type").

These types A, B, and C are the possible combinations of pulse waveform previously determined and pulse waveforms determined by recalculation. However, if, for example, the previously determined pulse waveform and the pulse waveform determined by recalculation are both A type, the corrected pulse waveform will have two pulses in a period, and the period of the PWM signal pulses will be shorter than the sampling period T. Therefore, to lengthen the period of the PWM signal pulses, it is necessary to use type B, in which recalculation performed in the on-duration of the previously determined pulse waveform, and the pulse waveform determined by recalculation is at the high level at the start of the period.

Also, for example, if the previously determined pulse waveform and the pulse waveform determined by recalculation are both B type, the on-duration of the previously determined pulse waveform will be such that the end time of the on-duration is uncertain in the first part of the period, so the timing at which recalculation is performed is limited to the duration only in the first part of the period of the previously determined pulse waveform. In this case, the previously performed calculation and the recalculation are spaced closer together, and the period of the corrected pulse waveform cannot be lengthened very much. Also, if the previously determined pulse waveform is C type and the pulse waveform determined by recalculation is B type, the on-duration of the previously determined pulse waveform will be such that the start time of the on-duration is uncertain in the latter part of the period, so the timing at which recalculation is performed is limited to the duration only in the latter part of the period of the previously determined pulse waveform. Because of the above, the optimal combination is one in which the previously determined pulse waveform is A type and the pulse waveform determined by recalculation is B type.

The periods of the previously determined pulse waveform and the pulse waveform determined by recalculation may be different from one another, but it is preferable for them to be the same in order to simplify the calculation processing. Also, there are no limitations on the position of the on-duration of the previously determined pulse waveform, but it is preferably disposed in the middle of the period in order to improve calculation processing accuracy. Nor are there limitations on the timing of recalculation, as long as it is within the on-duration of the previously determined pulse waveform, but it is preferably a timing in the middle of the period of the previously determined pulse waveform in order for the calculation processing for the previous calculation and the recalculation to be constant.

The method for generating the PWM signals generated by the inverter controller 4 will now be described in detail with reference to FIGS. 2 and 3. The following is a description of a first embodiment in which the previously determined pulse waveform is A type, the pulse waveform determined by recalculation is B type, the periods of the pulse waveforms are the same, the position of the on-duration of the previously determined pulse waveform is disposed in the middle of the period, and the timing of the recalculation is in the middle of the period of the previously determined pulse waveform.

Figure 2:
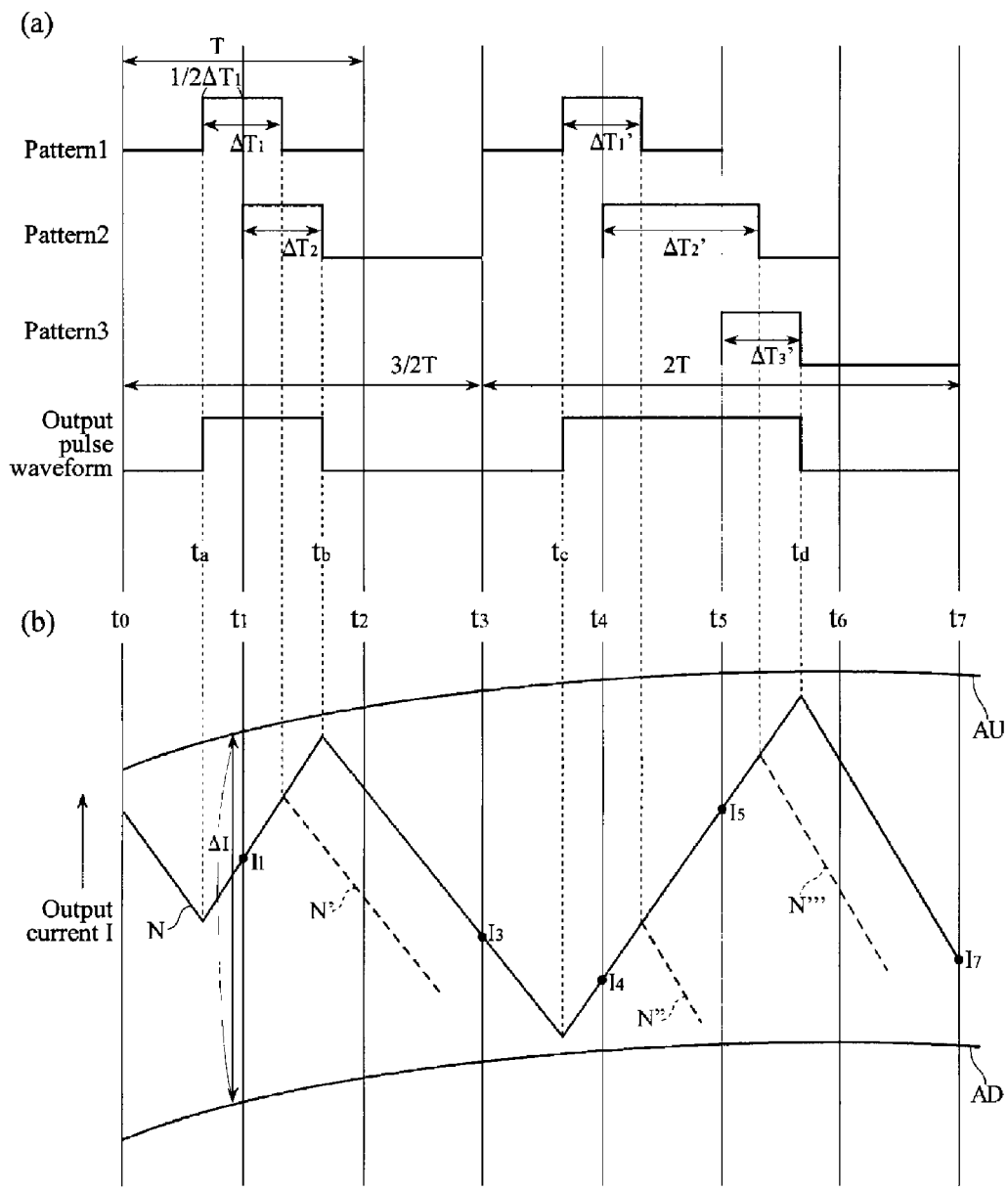
FIG. 2 is a diagram illustrating the method for generating the PWM signal that is generated by an inverter controller.
Figure 15:
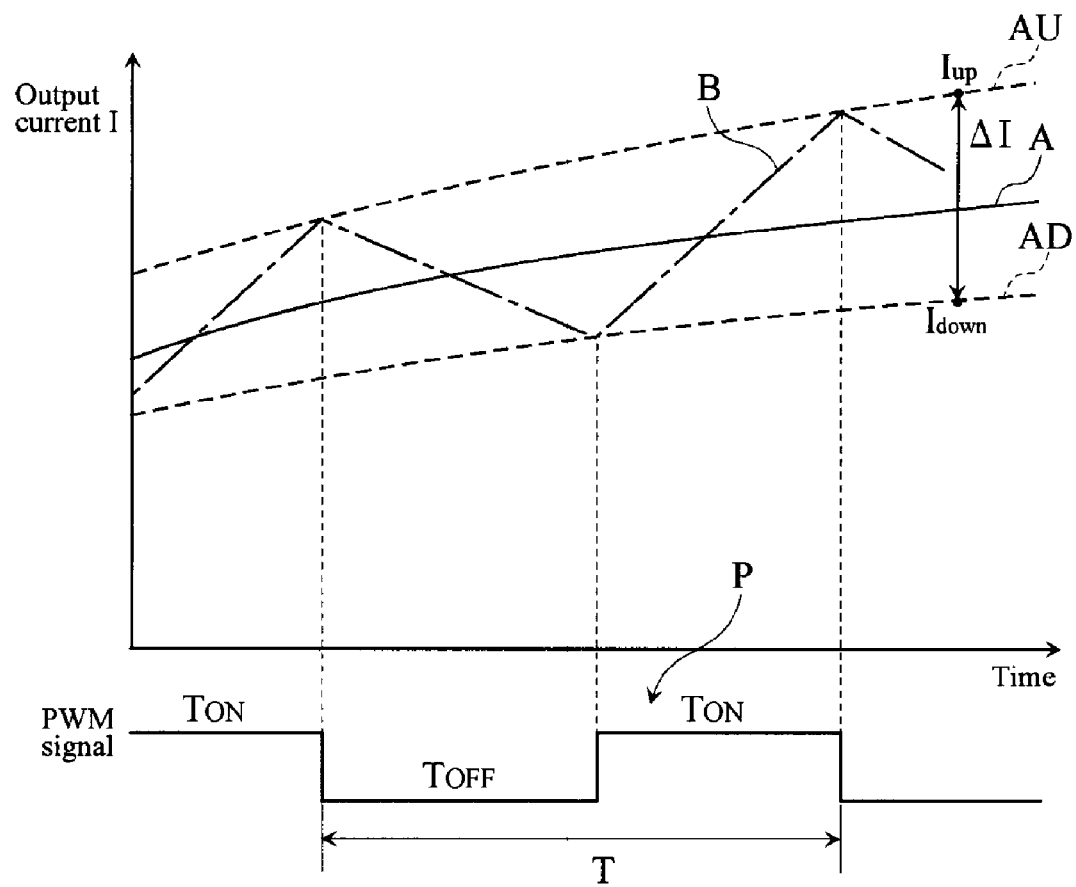
FIG. 15 is a diagram illustrating a method of current control by hysteresis.

FIG. 2 is a diagram illustrating the method for generating the PWM signal that is generated by the inverter controller 4. FIG. 2(*a*) is a waveform diagram showing how two kinds of pulse waveform are combined into an output pulse waveform. FIG. 2(*b*) is a diagram showing the relation between the output pulse waveform and the output current I of the inverter circuit 3, and corresponds to FIG. 15.

Figure 3:
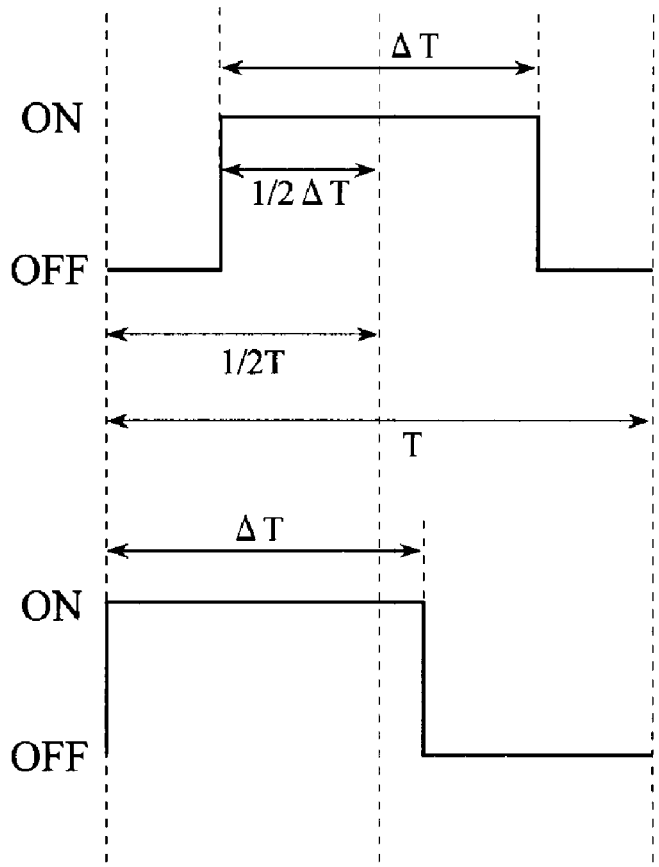
FIG. 3 is a diagram illustrating two kinds of pulse waveforms used in generating the PWM signal.

FIG. 3 is a diagram illustrating two kinds of pulse waveforms used in generating the PWM signal. The following description will be of the PWM signal S11, but the same method can be applied to the generation of the PWM signal S21 as well.

First, in FIG. 2, the on-time is calculated for when a preset initial period T (such as 0.17 ms) is used as one period, at a time instant of t=$t_0$. This calculation is intended to find the on-time of the pulse waveform of a PWM signal for holding the output current I within the allowable range, and the on-time is calculated from the on-time calculated before, the output voltage converted from the output current detected by the output current detector 7, and the target voltage. The calculation formula for this on-time is found from the state equation of the inverter device 1, and the method for calculating this calculation formula will be discussed below.

Next, a pulse waveform is generated in which the on-duration of the calculated on-time is located in the middle thereof (see FIG. 3(a); hereinafter referred to as the "first pulse waveform"; also, the on-time computed to generate the first pulse waveform is referred to as the "first on-time"). If the calculated first on-time is represented by $\Delta T_1$, this first pulse waveform comes on after the elapse of the time $(\frac{1}{2})\cdot(T-\Delta T_1)$ since the time instant $t_0$ at which this $\Delta T_1$ was calculated, and goes off after the elapse of the time $(\frac{1}{2})\cdot(T+\Delta T_1)$ (see the pulse waveform on the left side of the pattern 1 in FIG. 2).

Next, at t=$t_1$ after the elapse of the time $(\frac{1}{2})\cdot T$ from the time instant $t_0$, the on-time is again computed for when T is assumed to be one period.

In the example in FIG. 2(b), $I_1$ is the output current I at t=$t_1$, and the optimal on-time is calculated so that the output current I at this point will fall within the allowable range $\Delta I$. In the case where the time for calculating on-time is too short and the on-time is not calculated, since the previously generated first pulse waveform cannot be extended, the first pulse waveform generated as mentioned above is used as the output pulse waveform without the following processing being performed.

If the on-time is calculated at t=$t_1$, a pulse waveform is generated in which the on-duration of the calculated on-time is located at the leading edge (see FIG. 3(b); hereinafter referred to as the "second pulse waveform"; also, the on-time calculated to generate the second pulse waveform is referred to as the "second on-time"). With the calculated second on-time being represented by $\Delta T_2$, this second pulse waveform becomes on from the time instant $t_1$ at which the on-time was calculated, and goes off after the elapse of $\Delta T_2$ (see the pulse waveform on the left side of the pattern 2 in FIG. 2).

The inverter controller 4 generates the above-mentioned output pulse waveform in which two pulse waveforms are combined, and PWM signals are outputted on the basis of the output pulse waveforms (see the pulse waveform on the left side of the output pulse waveform in FIG. 2). This output pulse waveform is one in which the on-time is $(\frac{1}{2})\cdot\Delta T_1+\Delta T_2$, which becomes on after the elapse of the time $(\frac{1}{2})\cdot(T-\Delta T_1)$ since the time instant t=$t_0$ (hereinafter this time instant will be referred to as "$T_a$"), and becomes off after the elapse of the time $(\frac{1}{2})\cdot(T+\Delta T_2)$ (hereinafter this time instant will be referred to as "$T_b$"). As is clear from FIG. 2, the period of this output pulse waveform is $(\frac{3}{2})\cdot T$.

At t=$t_0$, the level of the PWM signal outputted from the inverter controller 4 is controlled on the basis of the output pulse waveform generated in the previous calculation processing, and becomes the low level in FIG. 2. After t=$t_0$, basically the level of the PWM signal outputted from the inverter controller 4 is controlled on the basis of the first pulse waveform calculated in the calculation processing at t $t_0$, so the PWM signals outputted from the inverter controller 4 is held at the low level, and the level of the PWM signal is inverted from the low level to the high level at t=$t_a$ on the basis of the calculation result at t=$t_0$.

The level of the PWM signal inverted to the high level continues until t=$t_a+\Delta T_1$, so the level of the PWM signal at t=$t_1$ is held at the high level. When $\Delta T_2$ is calculated in calculation processing at t=$t_1$, the second pulse waveform based on this $\Delta T_2$ is at the high level from t=$t_1$ to t=$t_b$ (=$t_1+\Delta T_2$), and at the low level from t=$t_b$ to t $t_3$, so the level of the PWM signal is held at the high level even beyond t=$t_1$, and is inverted to the low level based on the second pulse waveform at t=$t_b$.

The effect of controlling the level of the PWM signal outputted from the inverter controller 4 is that the output current I of the inverter circuit 3 is as shown by N, which is the solid line in FIG. 2(b). If calculation processing is not performed for correcting the on-time at t=$t_1$, and calculation processing of the next pulse waveform is instead performed at t=$t_2$, the output current I of the inverter circuit 3 is as shown by N', which is indicated by a broken line in FIG. 2(b).

As discussed above, the first pulse waveform is at the high level in the middle of the period T, and at the low level at both ends, so calculation processing for finding the first pulse waveform must be performed at the timing at which the PWM signal is at the low level. On the other hand, as discussed above, the second pulse waveform is at the high level at the leading edge of the period T, and is at the low level at the trailing edge, so in the present invention, basically a first pulse waveform is generated, after which calculation processing is performed for generating a second pulse waveform during the time that the PWM signal is at the high level on the basis of this first pulse waveform, and if a second pulse waveform is obtained, the period of the output pulse waveform is extended by combining this second pulse waveform with the first pulse waveform.

Thus, when the second on-time $\Delta T_2$ is calculated by recalculation, the period of the output pulse waveform is extended by $(\frac{1}{2})\Delta T$ from the initial period T. This allows the inverter controller 4 to generate PWM signals in which the period of the pulses is extended. Therefore, with the inverter device 1 pertaining to this embodiment, the number of times the switching elements TR1 to TR4 have to be switched is reduced and there is less switching loss than when the period of the pulses of the PWM signals is fixed at T, so the voltage conversion efficiency can be improved.

Also, in this embodiment, the calculation timing of the various on-times is fixed, and measurement values inputted from the outside are used only during calculation of the on-times, so the measurement values do not need to be monitored constantly. Also, since the inverter controller 4 is constituted by a digital control system, this affords greater universality and flexibility in design.

Also, in this embodiment, the on-duration of the first pulse waveform is disposed in the middle of the period. Therefore, it is less likely that the start time for the on-duration of the first pulse waveform has passed when the first on-time $\Delta T_1$ is calculated, or that this on-duration extends beyond one period, or that other such problems is encountered. And since the error is smallest in the calculation formula for the first on-time $\Delta T_1$, this improves the accuracy of the calculated first on-time $\Delta T_1$.

Also, in this embodiment, the calculation of the second on-time $\Delta T_2$ is performed in the middle of the period of the first pulse waveform. Therefore, it is less likely that the on-duration of the first pulse waveform has ended at the start time for the on-duration of the second pulse waveform, or that other such problems is encountered. Also, since the calculation periods for the first on-time $\Delta T_1$ and the second on-time $\Delta T_2$ are constant, control accuracy is better.

Also, in this embodiment, a method is employed for further extending the period of the output pulse waveform.

If the second on-time $\Delta T_2$ is shorter than $(\frac{1}{2})\cdot T$, then the PWM signal is at the low level at the end point of the period T used for computing the first pulse waveform. Also, the output pulse waveform at which the PWM signal is at the low level is found from the second pulse waveform for the duration of $(\frac{1}{2})\cdot T$ extended from the end point of the period T. Therefore, the calculation processing for the next first pulse waveform is performed at the point when this extended duration $(\frac{1}{2})\cdot T$ has ended (see the waveforms of patterns 1 and 2 for t=$t_0$ to $t_3$ in FIG. 2(a)).

On the other hand, if the second on-time $\Delta T_2$ of the second pulse waveform is longer than $(\frac{1}{2})\cdot T$, since the PWM signal will be at the high level at the end point of the period T used for computing the first pulse waveform, calculation processing for the second pulse waveform can be performed again at the end point of this period T. In view of this, in this embodiment, if the second pulse waveform is at the high level at the end point of the period T of the first pulse waveform, calculation processing for the second pulse waveform is performed again, and if the on-time is calculated in this calculation processing, the second pulse waveform from the second time will be further combined with the pulse waveform combined with the second pulse waveform of the first time, and this further extends the period the output pulse waveform.

Specifically, at t=$t_3$ in FIG. 2, calculation processing is performed for the next first pulse waveform, and after a first pulse waveform having a first on-time $\Delta T_1'$ is generated, calculation processing is performed for the second pulse waveform at t=$t_4$ (=$t_3$+$(\frac{1}{2})\cdot T$). The second on-time $\Delta T_2'$ calculated in this calculation processing is greater than $(\frac{1}{2})\cdot T$, so at t=$t_5$ a second on-time $\Delta T_3'$ is again computed. If $\Delta T_3'$ is not calculated here, a pulse waveform in which the first pulse waveform of the on-time $\Delta T_1'$ (see the pulse waveform on the right side of the pattern 1 in FIG. 2) and the second pulse waveform of the on-time $\Delta T_2'$ (see the pulse waveform on the right side of the pattern 2 in FIG. 2) are combined is generated as the output pulse waveform.

If $\Delta T_3'$ is calculated at t=$t_5$, and if $\Delta T_3'$ is shorter than $(\frac{1}{2})\cdot T$, then a pulse waveform in which the first pulse waveform of the on-time $\Delta T_1'$, the second pulse waveform of the on-time $\Delta T_2'$, and the second pulse waveform the on-time $\Delta T_3'$ are combined is generated as the output pulse waveform (see the pulse waveform on the right side of the output pulse waveform in FIG. 2). This output pulse waveform comes on after the elapse of the time $(\frac{1}{2})\cdot(T-\Delta T_1')$ since the time instant t=$t_3$ (hereinafter this time instant will be referred to as "$t_c$"), goes off after the elapse of the time $T \Delta T_3'$ (hereinafter this time instant will referred to as "$t_d$"), and is a pulse waveform in which the on-time is $(\frac{1}{2})\cdot T+(\frac{1}{2})\cdot \Delta T_1'+\Delta T_3'$. Also, as is clear from FIG. 2, the period of this output pulse waveform is 2·T.

The output current I of the inverter circuit 3 is as shown by N, which is the solid line in FIG. 2(b). If calculation processing is not performed for correcting the on-time at t=$t_4$, the output current I of the inverter circuit 3 is as shown by N", which is indicated by a broken line in FIG. 2(b). Also, if calculation processing is not performed for correcting the on-time at t=$t_5$, the output current I of the inverter circuit 3 is as shown by N''', which is indicated by a broken line in FIG. 2(b).

If $\Delta T_3'$ is greater than $(\frac{1}{2})\cdot T$, the PWM signal is at the high level at the end point of the period T used in computing the second pulse waveform, so the second on-time is again computed for the end point t=$t_6$ (=$t_5$+$(\frac{1}{2})\cdot T$) of this period T. Thereafter, the second on-time is calculated in the same manner, and if this on-time is greater than $(\frac{1}{2})\cdot T$, calculation of the second on-time is performed again at the time instant reached after the elapse of $(\frac{1}{2})\cdot T$ from the time instant at which this calculation processing was performed. This calculation processing of the second on-time is repeated until either the second on-time is not calculated or the calculated second on-time is less than or equal to $(\frac{1}{2})\cdot T$.

Thus, in this embodiment, the on-time and period of the output pulse waveform are extended as long as the second on-time is calculated and this second on-time is greater than $(\frac{1}{2})\cdot T$, that is, as long as the second pulse waveform is at the high level after the end point of the period T of the previous second pulse waveform. Consequently, the length of the period of each pulse of the PWM signal is $(\frac{1}{2})\cdot mT$ (where m is a natural number greater than or equal to 2), and compared to when the period of the PWM signal is fixed at T, the switching elements TR1 to TR4 are switched fewer times on average, switching loss is reduced, and the voltage conversion efficiency can be improved.

The calculation of on-time will now be described.

In this embodiment, in order to generate the PWM signal mainly by calculation processing, a PWM holding method is used to model the circuits of the inverter circuit 3 to the transformer 6 in the inverter device 1 as a linear system as described above. Specifically, in this embodiment the state equation in which the output voltage (pulse voltage) of the inverter circuit is used as input is modified, a state equation in which the on-time of the pulse of said output voltage is used as input (a state equation representing a linear system model) is derived, a formula for obtaining a solution is found from this state equation, and this formula is used to compute the on-time substantially in real time.

First, the method for deriving a state equation in which the on-time of the output pulse is used as input from a state equation in which the inverter output voltage is used as input will be described.

In modern control theory, various methods have been studied for analyzing the operating characteristics of a control object by finding a numerical model of a control object and an input/output relation for that numerical model, deriving an equation for the operating state (state equation), and solving this state equation.

In the case of a one-input, one-output system in which the control object is expressed by the following differential state equations (1) and (2), it is known that the solutions for the state variable x(t) and the output y(t) are expressed by the following formulas (3) and (4).

[E1]

$$\dot{x}(t) = A \cdot x(t) + B \cdot u(t) \quad (1)$$

$$y(t) = C \cdot x(t) + D \cdot u(t) \quad (2)$$

u(t): input vector
y(t): output vector
x(t): state variable vector
$\dot{x}$(t): derivative of x(t)
A, B, C, D: coefficient vectors

[E2]

$$x(t) = e^{A(t-t_0)} \cdot x(t_0) + \int_{t_0}^{t} e^{A(t-\tau)} \cdot B \cdot u(\tau) d\tau \qquad (3)$$

$$y(t) = C \cdot e^{A(t-t_0)} \cdot x(t_0) + \int_{t_0}^{t} C \cdot e^{A(t-\tau)} \cdot B \cdot u(\tau) d\tau + D \cdot u(t) \qquad (4)$$

$x(t_0)$: initial value of state variable

The input vector u(t) with the inverter device is the pulse voltage $v_i(t)$ outputted from the inverter circuit. The period of this input pulse is represented by T, and the state in which $t=(k+1) \cdot T$ will be considered from the state of $t_0=kT$. In formula (3) above, if u(t) is taken to be $v_i(t)$, and $t_0=kT$ and $t=(k+1) \cdot T$, the following formula (5) is obtained.

[E3]

$$x((k+1)T) = e^{AT}x(kT) + \int_{kT}^{(k+1)T} e^{A((k+1)T-\tau)} \cdot B \cdot v_i(\tau) d\tau \qquad (5)$$

Figure 4:
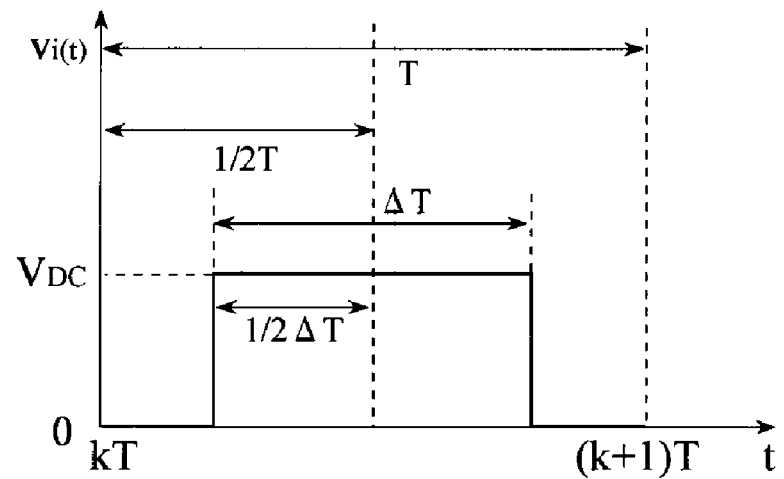
FIG. 4 is a diagram illustrating the pulse voltage that indicates inverter output voltage.

Here, as shown in FIG. 4, the inverter output voltage that is the input amount is pulse voltage with a size of $V_{DC}$ and a width of $\Delta T$, and has an A type pulse waveform in which the on-time is disposed in the middle. Therefore, if $kT \leq \tau < kT + (\frac{1}{2}) \cdot (T-\Delta T)$ and $kT + (\frac{1}{2}) \cdot (T+\Delta T) \leq \tau < (k+1) \cdot T$, then $v_i(\tau)=0$, and if $kT+(\frac{1}{2}) \cdot (T-\Delta T) \leq \tau < kT+(\frac{1}{2}) \cdot (T \Delta T)$, then $v_i(\tau)=V_{DC}$. Consequently, formula (5) above is modified into the following formula (6). Thus, the input parameter can be converted from the voltage of the inverter into the pulse width.

[E4]

$$x((k+1)T) = e^{AT}x(kT) + \int_{\frac{(T-\Delta T)}{2}}^{\frac{(T+\Delta T)}{2}} e^{A(T-\tau)} \cdot B \cdot V_{DC} d\tau \qquad (6)$$

When formula (6) above is modified into the following formula (7), supposing x[k]=x(kT), the following formula (8) is obtained. Thus, the inverter device 1 is expressed as a linear system in which the input is the on-time $\Delta T$.

[E5]

$$x((k+1)T) = e^{AT}x(kT) + A^{-1} \cdot \left\{ e^{\frac{A \cdot (T+\Delta T)}{2}} - e^{\frac{A \cdot (T-\Delta T)}{2}} \right\} \cdot B \cdot V_{DC} \qquad (7)$$

$$= e^{AT}x(kT) + A^{-1} \cdot e^{\frac{A \cdot T}{2}} \cdot \left\{ e^{\frac{A \cdot \Delta T}{2}} - e^{\frac{-A \cdot \Delta T}{2}} \right\} \cdot B \cdot V_{DC}$$

$$= e^{AT}x(kT) + e^{\frac{A \cdot T}{2}} \cdot \int_{-\frac{\Delta T}{2}}^{\frac{\Delta T}{2}} e^{A \cdot \Delta T} d\Delta T \cdot B \cdot V_{DC}$$

$$= e^{AT}x(kT) + e^{\frac{A \cdot T}{2}} \cdot \int_{kT}^{(k+1)T} \Delta T(k) d\Delta T \cdot B \cdot V_{DC}$$

[E6]

$$x[k+1] = A_T x[k] + B_T \Delta T[k] \qquad (8)$$
$$A_T = e^{AT}$$
$$B_T = e^{\frac{A \cdot T}{2}} \cdot B \cdot V_{DC}$$

Figure 5:
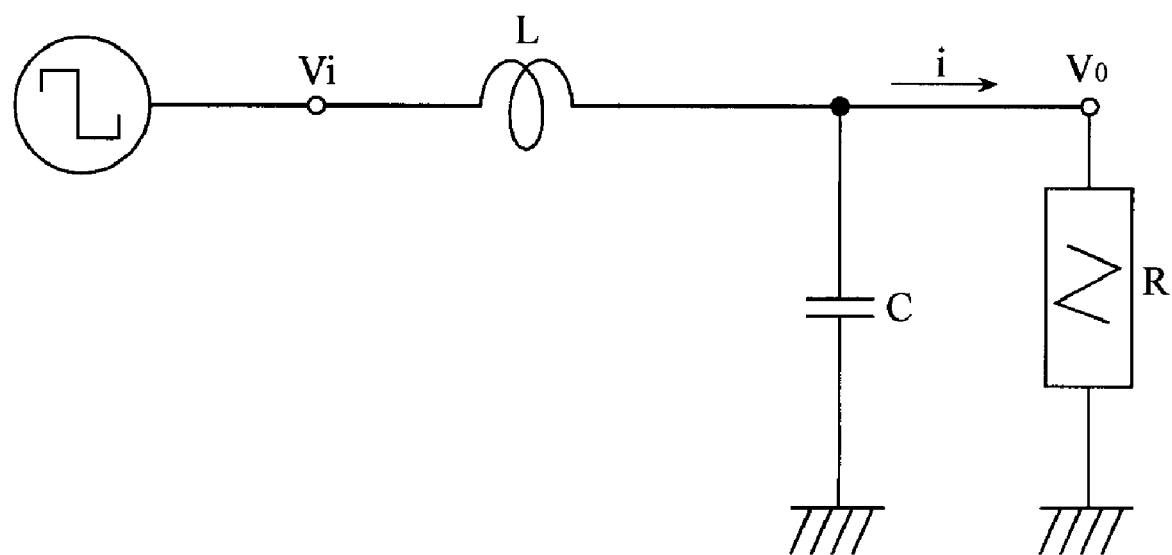
FIG. 5 is a circuit diagram showing a model of a simplified inverter device.

Next, a formula for computing the on-time from a state equation for a specific inverter device will be found. The electrical circuit formula of a model of the simplified inverter device shown in FIG. 5 is expressed by the following formula (9) from Kirchhoff's law. $v_i(t)$ and $v_o(t)$ are voltage values at time t for points $V_i$ and $V_O$ in FIG. 5, respectively.

[E7]

$$\frac{d}{dt}\begin{bmatrix} V_0(t) \\ \dot{V}_0(t) \end{bmatrix} = \begin{bmatrix} 0 & 1 \\ -\frac{1}{LC} & -\frac{1}{RC} \end{bmatrix} \begin{bmatrix} V_0(t) \\ \dot{V}_0(t) \end{bmatrix} + \begin{bmatrix} 0 \\ \frac{1}{LC} \end{bmatrix} Vi(t) \qquad (9)$$

By applying the above-mentioned PWM holding method to formula (9) above, and taking the input to be the on-time $\Delta T[k]$, the following formula (10) is obtained. To simplify the calculation of the various elements in the matrix, they are expressed by $\phi_{11}$, $\phi_{12}$, $\phi_{21}$, $\phi_{22}$, $g_1$, and $g_2$.

[E8]

$$\begin{bmatrix} V_0[k+1] \\ \dot{V}_0[k+1] \end{bmatrix} = \begin{bmatrix} \phi_{11} & \phi_{12} \\ \phi_{21} & \phi_{22} \end{bmatrix} \begin{bmatrix} V_0[k] \\ \dot{V}_0[k] \end{bmatrix} + \begin{bmatrix} g_1 \\ g_2 \end{bmatrix} \Delta T[k] \qquad (10)$$

In this embodiment, control is performed by deadbeat control. In the case of deadbeat control, the formula for computing the on-time $\Delta T[k]$ can be found by expanding formula (10) above. By expanding formula (10) above, the following formulas (11) and (12) are obtained. Multiplying both sides of the following formulas (11) and (12) by $\phi_{22}$ and $\phi_{12}$, respectively, and substituting (k+1) for k, the following formulas (13) and (14) are obtained.

[E9]

$$V_0[k+1] = \phi_{11}V_0[k] + \phi_{12}\dot{V}_0[k] + g_1\Delta T[k] \qquad (11)$$

$$\dot{V}_0[k+1] = \phi_{21}V_0[k] + \phi_{22}\dot{V}_0[k] + g_2\Delta T[k] \qquad (12)$$

$$\phi_{22}V_0[k] = \phi_{11}\phi_{22}V_0[k-1] + \phi_2\phi_{22}\dot{V}_0[k-1] + g_1\phi_{22}\Delta T[k-1] \qquad (13)$$

$$\phi_{12}\dot{V}_0[k] = \phi_{12}\phi_{21}V_0[k-1] + \phi_{12}\phi_{22}\dot{V}_0[k-1] + g_2\phi_{12}\Delta T[k-1] \qquad (14)$$

By combining the above formulas (13) and (14), the following formula (15) is obtained. By substituting this for the above formula (11) and modifying, the following formula (16) is obtained.

[E10]

$$\phi_{12}\dot{V}_0[k] = \qquad (15)$$
$$(\phi_{12}\phi_{21} - \phi_{11}\phi_{22})V_0[k-1] + (g_2\phi_{12} - g_1\phi_{22})\Delta T[k-1] + \phi_{22}V_0[k]$$

$$\Delta T[k] = \frac{\{V_0[k+1] - (\phi_{11} + \phi_{22})V_0[k] + (\phi_{11}\phi_{22} - \phi_{12}\phi_{21})V_0[k-1] + (g_1\phi_{22} - g_2\phi_{12})\Delta T[k-1]\}}{g_1} \qquad (16)$$

Using the above formula (16), the on-time $\Delta T[k]$ during the present sampling can be calculated from the on-time $\Delta T[k-1]$ and the output voltage $v_0[k-1]$ during the previous sampling, the output voltage $v_0[k]$ during the present sampling, and the target output voltage $v_0[k+1]$ during the next sampling.

The calculation formula for the on-time $\Delta T[k]$ described above is for calculating the on-time $\Delta T_1[k]$ of the first pulse waveform in which the on-duration in FIG. 3(a) is located in the middle. The calculation formula for the second on-time $\Delta T_2[k]$ of the second pulse waveform having a B type pulse waveform in which the on-duration in FIG. 3(b) is located at the leading edge side can be found in the same way, using a formula in which $B_T = e^{AT} \cdot V_{DC}$ in formula (8).

The above-mentioned calculation formula is one in a case of using deadbeat control. The present invention can also be applied to other types of control, but when another type of control is used, the on-time $\Delta T[k]$ must be calculated by a method that is compatible with that control.

In the above description, it was described that an output pulse waveform comprising a combination of two pulse waveforms was generated, in order to explain the concept of the method for generating PWM signals. Actually, the inverter controller 4 is constituted by the functional blocks shown in FIG. 6, the on timing is set from the calculated first on-time $\Delta T_1[k]$, the off timing is set from the second on-time $\Delta T_2[k+r]$ (where r is the number of times the second on-time has been recalculated) that was last calculated, and the output level of the PWM signal is switched at these timings.

Figure 6:
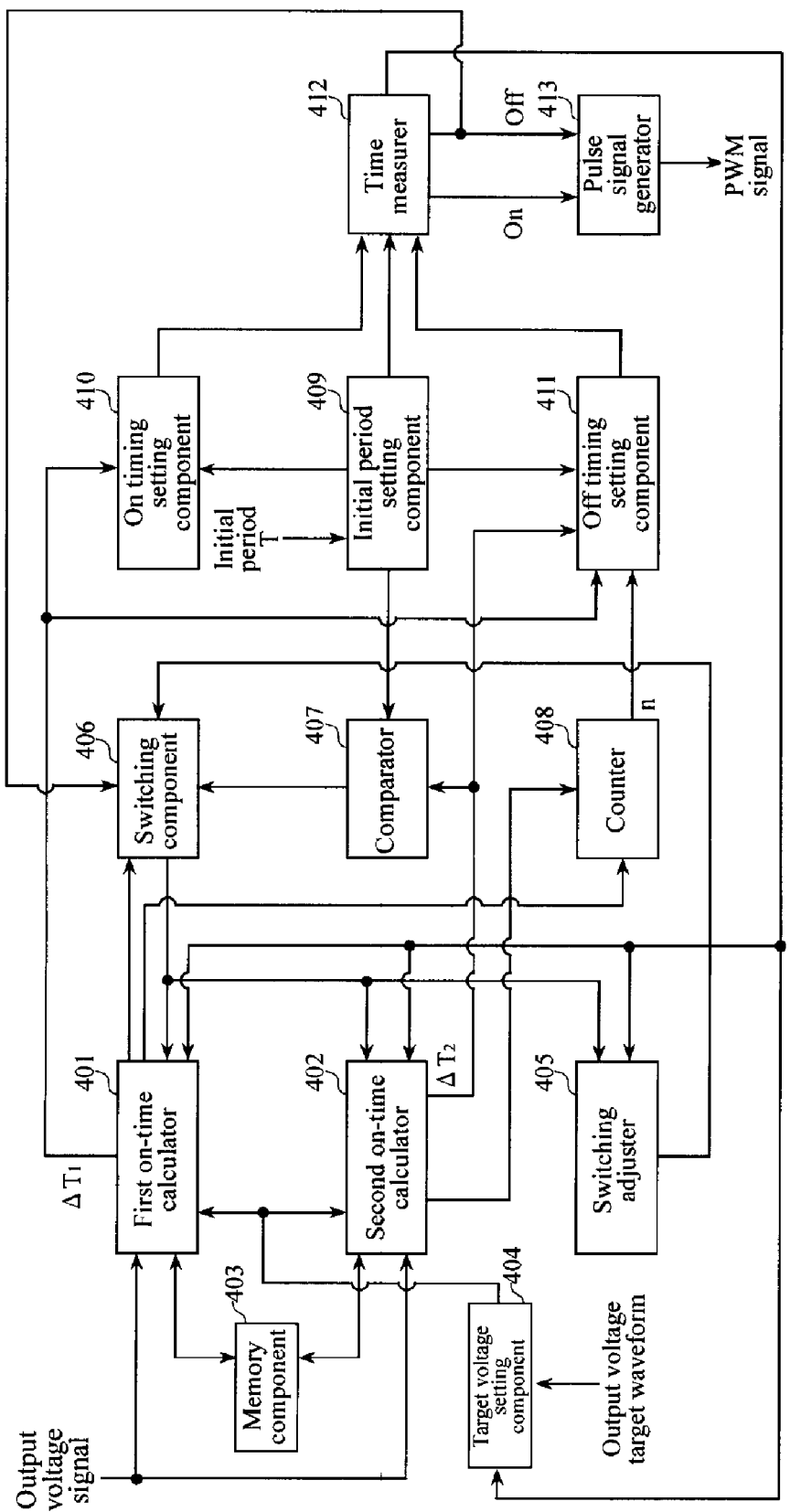
FIG. 6 is a block diagram of the PWM signal generation function of the inverter controller.

FIG. 6 is a block diagram of the PWM signal generation function of the inverter controller 4.

The inverter controller 4 includes, as function blocks for generating PWM signals, a first on-time calculator 401, a second on-time calculator 402, a memory component 403, a target voltage setting component 404, a switching adjuster 405, a switching component 406, a comparator 407, a counter 408, an initial period setting component 409, an on timing setting component 410, an off timing setting component 411, a time measurer 412, and a pulse signal generator 413.

The first on-time calculator 401 calculates the first on-time $\Delta T_1[k]$. The first on-time calculator 401 calculates the first on-time $\Delta T_1[k]$ when a time measurement signal has been inputted from the time measurer 412 in the case where a select signal has been inputted from the switching component 406. The first on-time calculator 401 uses the above formula (16), which is a calculation formula for the first on-time $\Delta T_1[k]$, to calculate the first on-time $\Delta T_1[k]$ at the current sampling from the output voltage $v_0[k]$ obtained by A/D conversion from the output voltage signal inputted and converted from the output voltage detector 7, the output voltage $v_0[k-1]$ used in the previous calculation and inputted from the memory component 403 (hereinafter referred to as the "previous output voltage"), the on-time $\Delta T[k-1]$ calculated the previous time (hereinafter referred to as the "previous on-time"), and the target voltage $v_0[k+1]$ inputted from the target voltage setting component 404.

The first on-time calculator 401 outputs the first on-time $\Delta T_1[k]$ calculated by calculation to the on timing setting component 410 and the off timing setting component 411, and outputs a switch signal to the switching component 406 and a reset signal to the counter 408. The first on-time calculator 401 also outputs the calculated first on-time $\Delta T_1[k]$ and the output voltage $v_0[k]$ used in calculation to the memory component 403. The first on-time $\Delta T_1[k]$ and the output voltage $v_0[k]$ here are utilized as the previous on-times $\Delta T_1[k]$ and $\Delta T_2[k]$ and the previous output voltage $v_0[k]$ in calculating the first on-time $\Delta T_1[k+1]$ or second on-time $\Delta T_2[k+1]$ at the next sampling.

The second on-time calculator 402 calculates the second on-time $\Delta T_2[k]$. The second on-time calculator 402 calculates the second on-time $\Delta T_2[k]$ when a time measurement signal has been inputted from the time measurer 412 in the case where a select signal has been inputted from the switching component 406. The second on-time calculator 402 uses a calculation formula for the second on-time $\Delta T_2[k]$, which is the same as the above formula (16), to calculate the second on-time $\Delta T_2[k]$ from the output voltage $v_0[k]$ obtained by A/D conversion from the output voltage signal, the output voltage $v_0[k-1]$ used in the previous calculation and inputted from the memory component 403, the on-time $\Delta T[k-1]$ calculated the previous time, and the target voltage $v_0[k+1]$ inputted from the target voltage setting component 404.

The second on-time calculator 402 outputs a count signal to the counter 408 when the second on-time $\Delta T_2[k]$ is calculated, and outputs the calculated second on-time $\Delta T_2[k]$ to the comparator 407 and the off timing setting component 411. The second on-time calculator 402 also outputs to the memory component 403 the calculated second on-time $\Delta T_2[k]$ and the output voltage $v_0[k]$ used for calculation. The second on-time $\Delta T_2[k]$ and the output voltage $v_0[k]$ here are utilized as the previous on-times $\Delta T_1[k]$ and $\Delta T_2[k]$ and the previous output voltage $v_0[k]$ in calculating the first on-time $\Delta T_1[k+1]$ or second on-time $\Delta T_2[k+1]$ at the next sampling.

The memory component 403 stores the output voltage $v_0[k]$ and the on-times $\Delta T_1[k]$ and $\Delta T_2[k]$ inputted from the first on-time calculator 401 or the second on-time calculator 402 by overwriting them over the stored output voltage (the previous output voltage $v_0[k-1]$) and the on-times (the previous on-times $\Delta T_1[k-1]$ and $\Delta T_2[k-1]$). The memory component 403 also outputs the stored output voltage $v_0[k]$ and on-times $\Delta T_1[k]$ and $\Delta T_2[k]$ to the first on-time calculator 401 and the second on-time calculator 402 as the previous output voltage and previous on-times.

The target voltage setting component 404 outputs to the first on-time calculator 401 and the second on-time calculator 402 the target voltage corresponding to the target waveform of the preset output voltage, when a time measurement signal is inputted from the time measurer 412.

The switching adjuster 405 adjusts the switching of the switching component 406 in order to adjust the time it takes from the calculation of the on-time $\Delta T_2$ of the second pulse waveform by the second on-time calculator 402 until the calculation of the on-time $\Delta T_1$ of the first pulse waveform by the first on-time calculator 401. The switching adjuster 405 outputs a switch signal to the switching component 406 when a time measurement signal has been inputted from the time measurer 412 if a select signal has been inputted from the switching component 406.

The switching component 406 switches the method for calculating the on-time. The switching component 406 outputs a select signal to either the first on-time calculator 401, the second on-time calculator 402, or the switching adjuster 405, whichever has been selected. The switching component 406 changes the output destination of the select signal when a switch signal is inputted from the first on-time calculator 401, the switching adjuster 405, the comparator 407, or the time measurer 412.

When a switch signal is inputted from the first on-time calculator 401 in the case where the first on-time calculator 401 is selected, the switching component 406 changes the selection to the second on-time calculator 402. When a switch signal is inputted from the comparator 407 in the case where the second on-time calculator 402 is selected, the selection is changed to the switching adjuster 405, and when a switch signal from the time measurer 412 is inputted, the selection is changed to the first on-time calculator 401. Also, when a switch signal is inputted from the switching adjuster 405 in the case where the switching adjuster 405 is selected, the selection is changed to the first on-time calculator 401.

Figure 7:
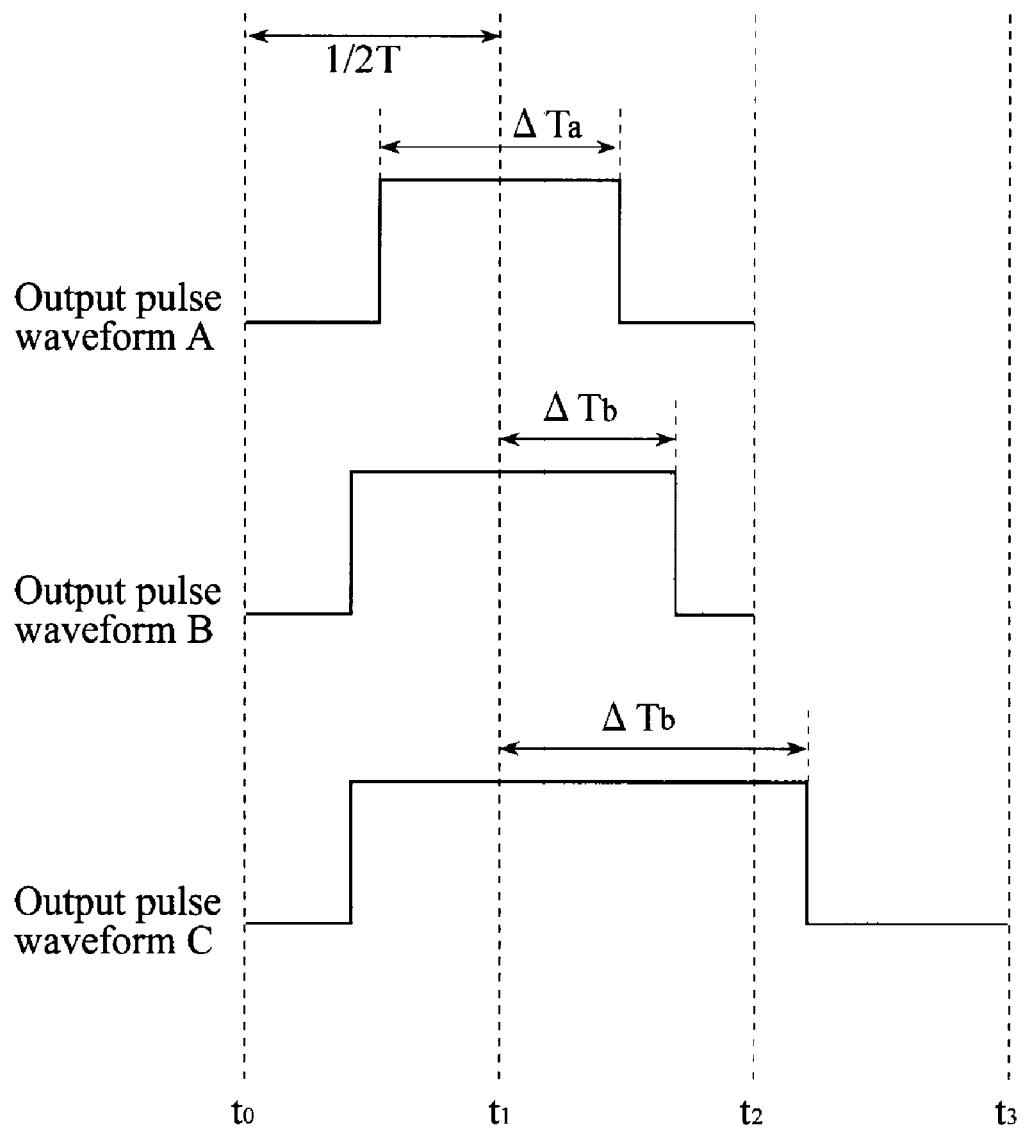
FIG. 7 is a diagram illustrating the function of the switching component.

FIG. 7 is a diagram illustrating the function of the switching component 406. In FIG. 7, the first on-time is indicated by $\Delta T_a$, and the second on-time by $\Delta T_b$. FIG. 7 shows the output pulse waveforms for when the second on-time $\Delta T_b$ was not calculated (output pulse waveform A), when the calculated second on-time $\Delta T_b$ was shorter than half of the initial period T (output pulse waveform B), and when it was longer than half of the initial period T (output pulse waveform C).

The output pulse waveform A is the output pulse waveform in the case where the second on-time $\Delta T_b$ was not calculated after the calculation of the first on-time $\Delta T_a$. The selection switching of the switching component 406 when this output pulse waveform A is generated will be described.

At first, the switching component 406 selects the first on-time calculator 401. Therefore, when a time measurement signal is inputted from the time measurer 412 at t=$t_0$, the first on-time calculator 401 computes the first on-time $\Delta T_a$. When the first on-time calculator 401 calculates the first on-time $\Delta T_a$ and a switch signal is outputted to the switching component 406, the switching component 406 to which the switch signal was inputted changes the selection to the second on-time calculator 402. Next, when a time measurement signal is inputted from the time measurer 412 at t=$t_1$, the second on-time calculator 402 computes the second on-time $\Delta T_b$. However, since the off timing is reached without the second on-time $\Delta T_b$, being calculated, the time measurer 412 outputs a switch signal to the switching component 406. The switching component 406 to which the switch signal was inputted changes the selection to the first on-time calculator 401. Next, when a time measurement signal is inputted from the time measurer 412 at t=$t_2$, the first on-time calculator 401 computes the first on-time $\Delta T_a$.

Returning to FIG. 6, the comparator 407 compares the initial period T set by the initial period setting component 409 with the second on-time $\Delta T_2$ inputted from the second on-time calculator 402. In the case where the second on-time $\Delta T_2$ is less than $(\frac{1}{2}) \cdot T$, the comparator 407 outputs a switch signal to the switching component 406, and outputs the second on-time $\Delta T_2$ to the off timing setting component 411. In the case where the second on-time $\Delta T_2$ is at least $(\frac{1}{2}) \cdot T$, the second on-time $\Delta T_2$ is computed again by the second on-time calculator 402, so no switch signal is outputted.

In FIG. 7, the output pulse waveform B is the output pulse waveform when the second on-time $\Delta T_b$, is calculated after the calculation of the first on-time $\Delta T_a$, and this $\Delta T_b$ is shorter than $(\frac{1}{2}) \cdot T$. Until the second on-time calculator 402 computes the second on-time $\Delta T_b$, at t=$t_1$, everything is the same as during the above-mentioned generation of the output pulse waveform A. Since the second on-time $\Delta T_b$ is calculated, this second on-time $\Delta T_b$, is inputted to the comparator 407. Since the second on-time $\Delta T_b$, is less than $(\frac{1}{2}) \cdot T$, the comparator 407 outputs a switch signal to the switching component 406. The switching component 406 to which the switch signal was inputted changes the selection to the switching adjuster 405. The switching adjuster 405 to which a time measurement signal has been inputted from the time measurer 412 at t=$t_2$ outputs a switch signal to the switching component 406. The switching component 406 changes the selection to the first on-time calculator 401 when a switch signal is inputted from the switching adjuster 405. Next, when a time measurement signal is inputted from the time measurer 412 at t=$t_3$, the first on-time calculator 401 computes the first on-time $\Delta T_a$.

The output pulse waveform C is the output pulse waveform when the second on-time $\Delta T_b$, has been calculated after the calculation of the first on-time $\Delta T_a$, this $\Delta T_b$ is at least $(\frac{1}{2}) \cdot T$, and the second on-time has been calculated again, but $\Delta T_b$, has not be calculated. Until the second on-time $\Delta T_b$, calculated at t=$t_1$ is inputted to the comparator 407, everything is the same as during the above-mentioned generation of the output pulse waveform B. Since $\Delta T_b$, is at least $(\frac{1}{2}) \cdot T$, the comparator 407 does not output a switch signal to the switching component 406. When a time measurement signal is inputted from the time measurer 412 at t=$t_2$, the second on-time calculator 402 computes the second on-time $\Delta T_b$. However, since the off timing is reached without the second on-time $\Delta T_b$, being calculated, the time measurer 412 outputs a switch signal to the switching component 406. The switching component 406 to which the switch signal was inputted changes the selection to the first on-time calculator 401. Next, when a time measurement signal is inputted from the time measurer 412 at t=$t_3$, the first on-time calculator 401 computes the first on-time $\Delta T_a$.

Returning to FIG. 6, the counter 408 counts the number of times the second on-time calculator 402 has calculated the second on-time. The count is initialized to n=0 when a reset signal is inputted from the first on-time calculator 401, and is incremented by one each time a count signal is inputted from the second on-time calculator 402.

The initial period setting component 409 sets the initial period T, which is the basis period of the PWM signal. The initial period T is determined ahead of time on the basis of the user's experience, and in this embodiment it is set to 0.17 ms.

The on timing setting component 410 sets the time instant of the next on timing, and the off timing setting component 411 sets the time instant of the next off timing.

The on timing setting component 410 computes the time $(\frac{1}{2}) \cdot (T - \Delta T_1)$ from the first on-time $\Delta T_1$ inputted from the first on-time calculator 401 and the initial period T set by the initial period setting component 409. This time is added to the time instant at which the first on-time $\Delta T_1$ was computed, and this is set as the time instant of the next on timing. For example, in FIG. 2(a), the calculated time instants $t_a$ and $t_c$ are set. The set time instants for on timing are inputted to the time measurer 412.

The off timing setting component 411 computes the time $(\frac{1}{2}) \cdot (T + \Delta T_1)$ from the inputted first on-time $\Delta T_1$ and the initial period T set by the initial period setting component 409 when the first on-time $\Delta T_1$ has been inputted from the first on-time calculator 401. This time is added to the time instant at which the first on-time $\Delta T_1$ was computed, and this is set as the time instant of the next off timing. The set time instants for off timing are inputted to the time measurer 412.

The off timing setting component 411 also calculates the time $(\frac{1}{2}) \cdot n \cdot T + \Delta T_2$ from the inputted second on-time $\Delta T_2$, the initial period T set by the initial period setting component 409, and the count n inputted from the counter 408 when the second on-time $\Delta T_2$ has been inputted from the second on-time calculator 402 prior to the set time instant of the off timing. This time is added to the time instant at which the second on-time $\Delta T_2$ was calculated, and this is set as the time instant of the next off timing. For example, in FIG. 2(a), the calculated time instants $t_b$ and $t_d$ are set. The set time instants for off timing are inputted to the time measurer 412. If the second on-time $\Delta T_2$ is inputted from the second on-time calculator 402 prior to the set time instant of the off timing, then the off timing is set again.

The time measurer 412 keeps track of the time instant of the on timing inputted from the on timing setting component 410 and the time instant of the off timing inputted from the off timing setting component 411. The time measurer 412 outputs a time measurement signal to the pulse signal generator 413 every time the on timing time instant is checked. The time measurer 412 also outputs a time measurement signal to the pulse signal generator 413 and outputs a switch signal to the switching component 406 every time the off timing time instant is checked. Also, the time measurer 412 outputs a time measurement signal to the first on-time calculator 401, the second on-time calculator 402, the target voltage setting component 404, and the switching adjuster 405 every time the time $(1/2) \cdot T$, which is half the initial period T set by the initial period setting component 409, has elapsed.

The pulse signal generator 413 generates a pulse signal by switching the level to high when an on timing time measurement signal is inputted from the time measurer 412, and switching the level is switched to low when an off timing time measurement signal is inputted from the time measurer 412. This pulse signal is outputted as a PWM signal 811 to the switching element TR1 of the inverter circuit 3. This pulse signal is also inverted and outputted to the switching element TR2 of the inverter circuit 3.

Next, the procedure for generating a PWM signal in the inverter controller 4 will be described with reference to the flowchart of FIG. 8. In the following description, the PWM signal S11 will be used as an example.

Figure 8:
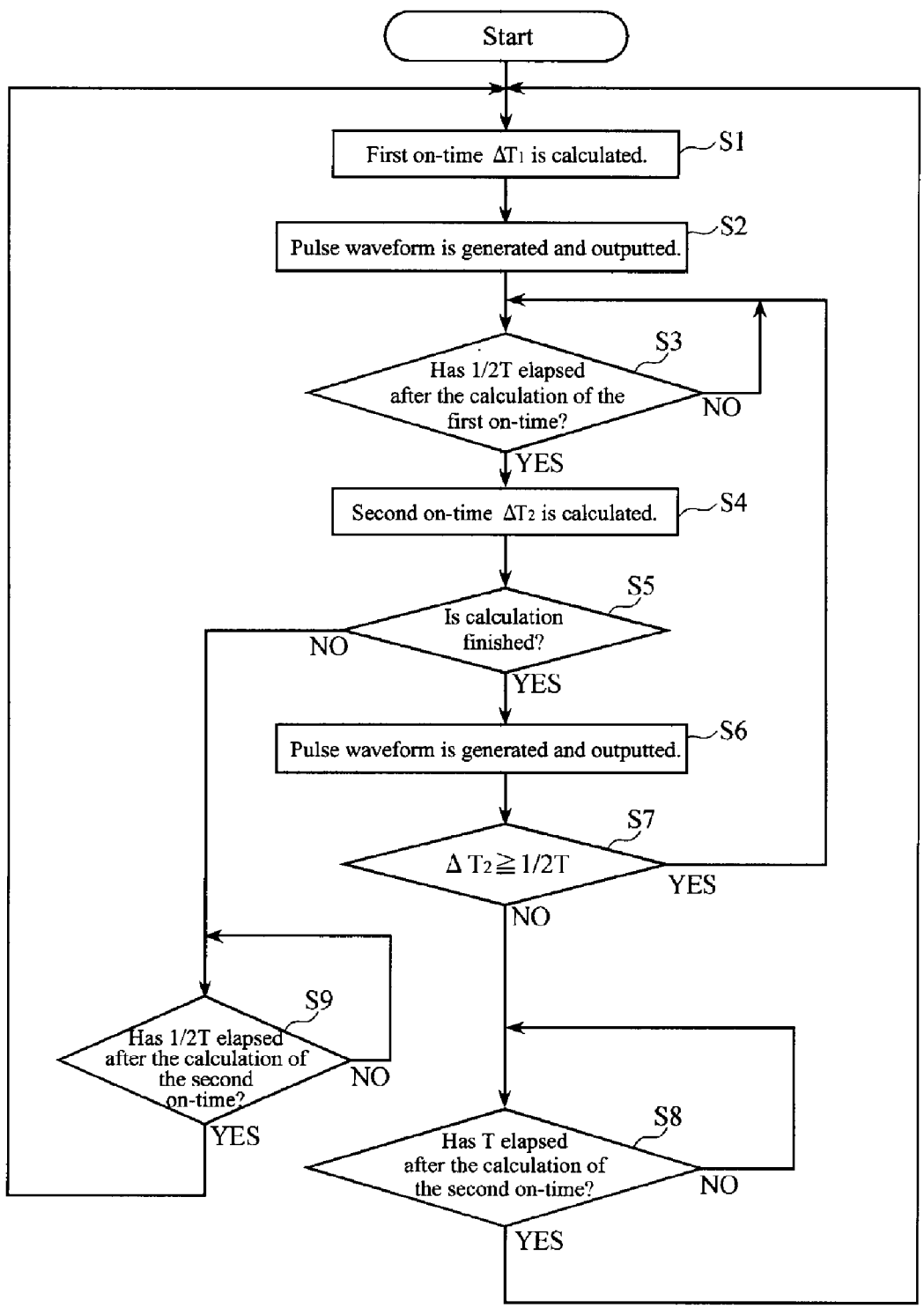
FIG. 8 is a flowchart of the procedure of generating a PWM signal in the inverter controller.

The flowchart in FIG. 8 shows the actual generation processing for a PWM signal by the inverter controller 4 over time.

First, the first on-time $\Delta T_1$ is calculated with a preset initial period T being treated as one period (S1). A first pulse waveform in which the on-duration of the calculated first on-time $\Delta T_1$ is located in the middle is generated and outputted (S2).

Next, it is determined whether the time of $(1/2) \cdot T$ has elapsed (S3) after the first on-time $\Delta T_1$ is calculated, or not. If it has not elapsed (S3: No), the flow returns to step S3, but if it has elapsed (S3: Yes), the second on-time $\Delta T_2$ is calculated (S4). Specifically, the second on-time $\Delta T_2$ is calculated once $(1/2) \cdot T$ has elapsed after the first on-time $\Delta T_1$ is computed.

Next, it is determined whether or not the second on-time $\Delta T_2$ has been calculated (S5). If it is possible to extend the output pulse waveform, the second on-time $\Delta T_2$ is calculated, but if it is impossible to extend the output pulse waveform, the second on-time $\Delta T_2$ is not calculated. If the second on-time $\Delta T_2$ has been calculated (S5: Yes), a second pulse waveform is generated and outputted in which the on-duration of the calculated second on-time $\Delta T_2$ is located on the leading edge side (step S6). Specifically, the on-duration of the output pulse waveform is extended.

Next, it is determined whether the second on-time $\Delta T_2$ is at least $(1/2) \cdot T$ (S7) or not. If $\Delta T_2 \geq (1/2) \cdot T$ (S7: Yes), $(1/2) \cdot T$ will elapse from the calculation of the second on-time $\Delta T_2$ sooner than the off timing of the output pulse waveform, so the flow proceeds to step S3 to determine whether or not extension of the output pulse waveform again is possible. Specifically, the second on-time $\Delta T_2$ is computed again after the elapse of $(1/2) \cdot T$ since calculation of the second on-time $\Delta T_2$ the first time. This is repeated and the output pulse waveform is extended as long as the calculated second on-time $\Delta T_2$ is at least $(1/2) \cdot T$.

The output pulse waveform on the right side in FIG. 2(a) is one in which the second on-time $\Delta T_2$ calculated the first time is at least $(1/2) \cdot T$, and the second on-time $\Delta T_2$ has been calculated again.

In step S7, if $\Delta T_2 < (1/2) \cdot T$ (S7: No), the output pulse waveform will go off before $(1/2) \cdot T$ has elapsed since the calculation of the second on-time $\Delta T_2$, so the flow proceeds to step S8 without the second on-time $\Delta T_2$ being calculated again.

In step S8, it is determined whether a time of T has elapsed after the calculation of the second on-time $\Delta T_2$ (S8) or not. If it has not elapsed yet (S8: No), the flow returns to step S8, but if it has already elapsed (S8: Yes), the flow returns to step S1. Specifically, the first on-time $\Delta T_1$ is computed to generate the next output pulse waveform after the elapse of T since the calculation of the last second on-time $\Delta T_2$.

The output pulse waveform on the left side in FIG. 2(a) is the one when the second on-time $\Delta T_2$ calculated the first time is less than $(1/2) \cdot T$. The output pulse waveform on the right side in FIG. 2(a) is the one when the second on-time $\Delta T_2$ calculated the second time is than $(1/2) \cdot T$.

In step S5, if the second on-time $\Delta T_2$ has not be calculated (S5: No), it is determined whether the time of $(1/2) \cdot T$ has elapsed after the calculation of the second on-time $\Delta T_2$ (S9) or not. If it has not elapsed yet (S9: No), the flow returns to step S9, but if it has already elapsed (S9: Yes), the flow returns to step S1. Specifically, the first on-time $\Delta T_1$ is calculated to generate the next output pulse waveform after $(1/2) \cdot T$ has elapsed after the calculation of the second on-time $\Delta T_2$.

As discussed above, with the inverter device 1 pertaining to the present invention, a preset initial period T is used as the basic period for each period of a PWM signal, and the length of each period of the PWM signal is extended on the basis of an on-duration calculated by calculation. If the initial period T is set relatively short, then the calculation of the first on-time $\Delta T_1$ will not end by the time of the on timing, or calculation cannot be ended and the period cannot be extended by the off timing. On the other hand, if the initial period T is set relatively long, there is a possibility that the on-time for maintaining the output current within the allowable range cannot be obtained.

Therefore, the initial period T is set to a suitable value by experimentation, simulation, or the like, but a control member for changing the initial period T may be provided to the inverter device 1 so that the user can adjust to the desired value.

Also, with the inverter device 1 pertaining to the present invention, the length of each period of the PWM signal is extended, but since the control period is the same as with the initial period T that is not extended, theoretically there is no decrease in control precision. Also, when period extension is performed, the calculation of the second on-time $\Delta T_2$ is performed during the on-duration of the output pulse waveform, so there is substantially no calculation lag.

In a simulation, switching was performed 120 times within one period of the output voltage when period extension was not performed at an initial period T=0.17 ms, but with the inverter device of this embodiment, switching was performed only 74 times under the same conditions, so there was a reduction in the number of times switching was necessary. A similar effect was obtained with other types of control (feedback control, two-degree-of-freedom control).

In the first embodiment given above, the first pulse waveform was generated as a pulse waveform in which the on-duration was located in the middle of one period, but the present invention is not limited to this. Specifically, the first pulse waveform can be a pulse waveform in which the on-duration is located anywhere within one period.

The formulas (1) to (8) given above can be expanded so that the inverter device 1 is represented as a linear system in which the input is the on-time $\Delta T$, and in this formula expansion, the first pulse waveform is a pulse waveform in which the on-duration is located in the middle of one period, so the range of the integration of the second term in formula (6) is $((1/2) \cdot (T - \Delta T), (1/2) \cdot T + \Delta T))$.

With the present invention, the first pulse waveform can be defined as a pulse waveform in which the on-duration is disposed at any location within a period T. Specifically, the first pulse waveform can be defined as a pulse waveform in which the middle of the on-duration is located at $h \cdot T$ ($0 < h < 1$), and formula (8) for finding this pulse waveform can be found using the integration range of the second term in formula (6) as $((h \cdot T - (1/2) \cdot \Delta T), (h \cdot T + (1/2) \cdot \Delta T))$.

Therefore, if a formula corresponding to formula (8) is found in which the range of integration of the second term in formula (6) is $((1/3) \cdot T-(1/2) \cdot \Delta T)$, $((1/3) \cdot T+(1/2) \cdot \Delta T)$, and a formula is found for finding $\Delta T$ from this formula by the same method as the formula expansion of formulas (9) to (16), then the formula for calculating $\Delta T$ will be one in which the first pulse waveform is a pulse waveform in which the middle of the on-duration is located at $(1/3) \cdot T$ within one period.

Since it is not permitted for the first pulse waveform to be such that the on-duration is outside of the period T when the middle of the on-duration of the calculated on-time $\Delta T$ is disposed at $h \cdot T$ ($0<h<1$) in the period T, at $0<h<1/2$, it is necessary to satisfy $0<h \cdot T-(1/2) \cdot \Delta T$, and at $1/2<h<1$, to satisfy $h \cdot T+(1/2) \cdot \Delta T<T$. For example, if the first pulse waveform is a pulse waveform in which the middle of the on-duration is located at $(1/3)\Delta T$ in one period, then it is necessary to satisfy $0<(1/3) \cdot T-(1/2) \cdot \Delta T$, that is, $\Delta T<(2/3) \cdot T$.

Figure 9:
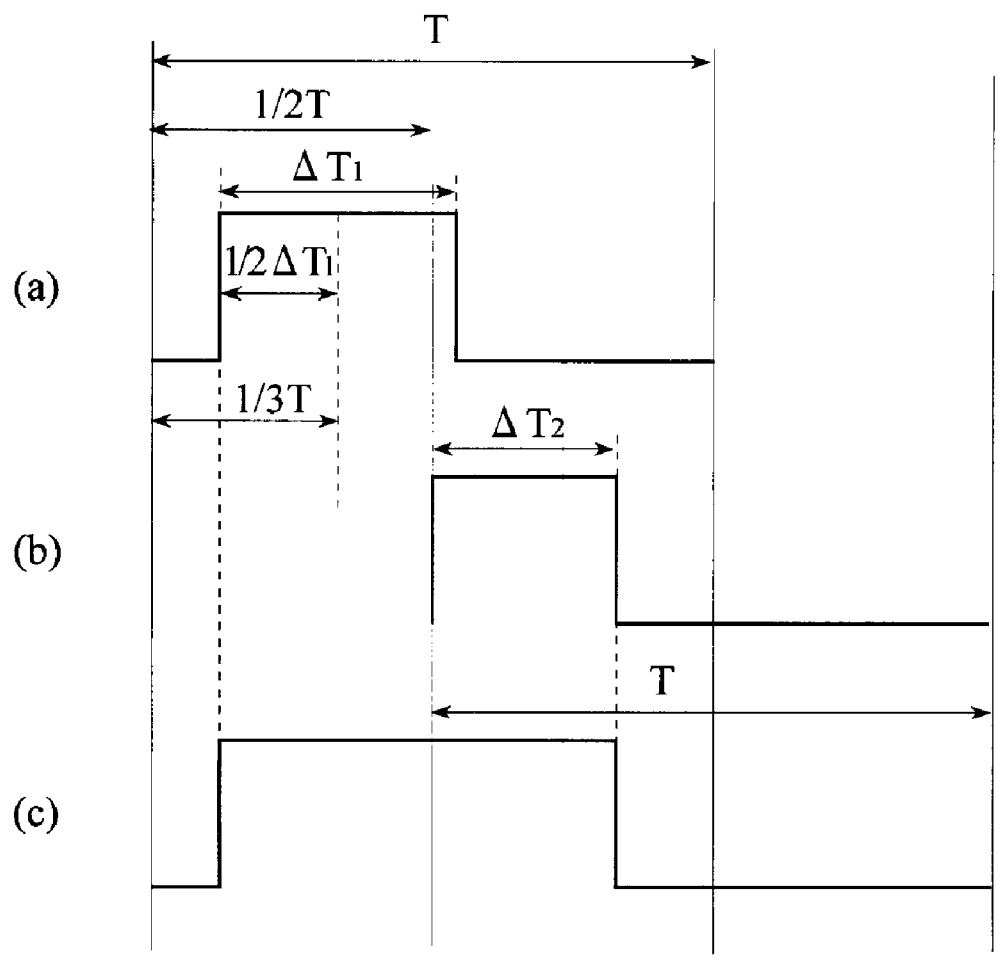
FIG. 9 is a diagram illustrating the output pulse waveform according to a second embodiment.

FIG. 9 is a diagram illustrating a case of the first pulse waveform in which the on-duration is shifted from the middle of one period (hereinafter this case will be referred to as the "second embodiment").

As shown in FIG. 9(a), the first pulse waveform is generated as a pulse waveform in which the middle of the on-duration of the first on-time $\Delta T_1$ is located at $(1/3) \cdot T$. This first pulse waveform comes on after the elapse of the time $\{(1/3) \cdot T-(1/2) \cdot \Delta T_1\}$ since the time instant at which the first on-time $\Delta T_1$ was computed (the time instant at the start of one period T), and goes off after the elapse of the time $\{(1/3) \cdot T-(1/2) \cdot \Delta T_1\}$. Here again, the second on-time $\Delta T_2$ is computed for when T is one period after the elapse of the time $(1/2) \cdot T$.

FIG. 9(b) shows a second pulse waveform having the on-duration of the second on-time $\Delta T_2$. This second pulse waveform comes on at the time instant at which the second on-time $\Delta T_2$ was calculated (the time instant of $(1/2) \cdot T$ in one period T), and goes off after the elapse of the time $\Delta T_2$. The inverter controller 4 outputs an output pulse waveform in which the above two pulse waveforms are combined (see FIG. 9(c)). This output pulse waveform is a pulse waveform that comes on after the elapse of the time $\{(1/3) \cdot T-(1/2) \cdot \Delta T_1\}$ since the time instant at which the first on-time $\Delta T_1$ was computed (the time instant at the start of one period T), and goes off after the elapse of the time $\{(1/2) \cdot T+\Delta T_2\}$, and in which the on-time is $\{(1/6) \cdot T+(1/2) \cdot \Delta T_1+\Delta T_2\}$.

As is clear from FIG. 9(c), the period of this output pulse waveform is $(3/2) \cdot T$. If the second on-time $\Delta T_2$ is longer than $(1/2) \cdot T$, that is, if the second pulse waveform is at the high level at the end point of the period T of the first pulse waveform, then the second on-time $\Delta T_2$ is computed again just as in the first embodiment, and the period of the output pulse waveform is further extended.

As discussed above, with the present invention the pulse waveform of the PWM signal is generated one pulse at a time by finding the on-time $\Delta T$ disposed at a preset location of a preset period T. In this generation processing for one pulse of pulse waveform, the on-time $\Delta T$ is recomputed every time T/2 elapses in each period, and each period is extended in T/2 units on the basis of this recalculation result.

Therefore, the period of the output pulse waveform can be extended again in the second embodiment, just as in the first embodiment. Also, the calculation period for the first on-time $\Delta T_1$ and the second on-time $\Delta T_2$ for extending the period is constant.

However, since not having the on-duration of the first pulse waveform located in the middle of one period increases the error in the calculation formula for the first on-time $\Delta T_1$, the accuracy of the calculated first on-time is lower in the second embodiment than in the first embodiment. Also, with the present invention, where the on-duration of the first pulse waveform is located in the period has to be preset (that is, the value of h has to be preset), but if this location is set near the leading edge side (that is, if h is close to 0), there will be problems such as when the starting time instant of the on-duration of the first pulse waveform is exceeded during calculation of the first on-time $\Delta T_1$, or when this on-duration goes beyond one period.

With the present invention, where the on-duration of the first pulse waveform is disposed in the period T is not directly related to whether or not the pulse period T can be extended in the PWM signal. Therefore, to avoid such problems as much as possible, it is preferable if the first pulse waveform is generated as a pulse waveform in which the on-duration is located in the middle of one period.

Also, in the first and second embodiments, the timing of the calculation of the second on-time $\Delta T_2$ is after the elapse of the time $(1/2)\Delta T$ since the calculation of the first on-time $\Delta T_1$, but the present invention is not limited to this timing. The calculation of the second on-time $\Delta T_2$ may be performed at a predetermined timing after the calculation of the first on-time $\Delta T_1$.

Figure 10:
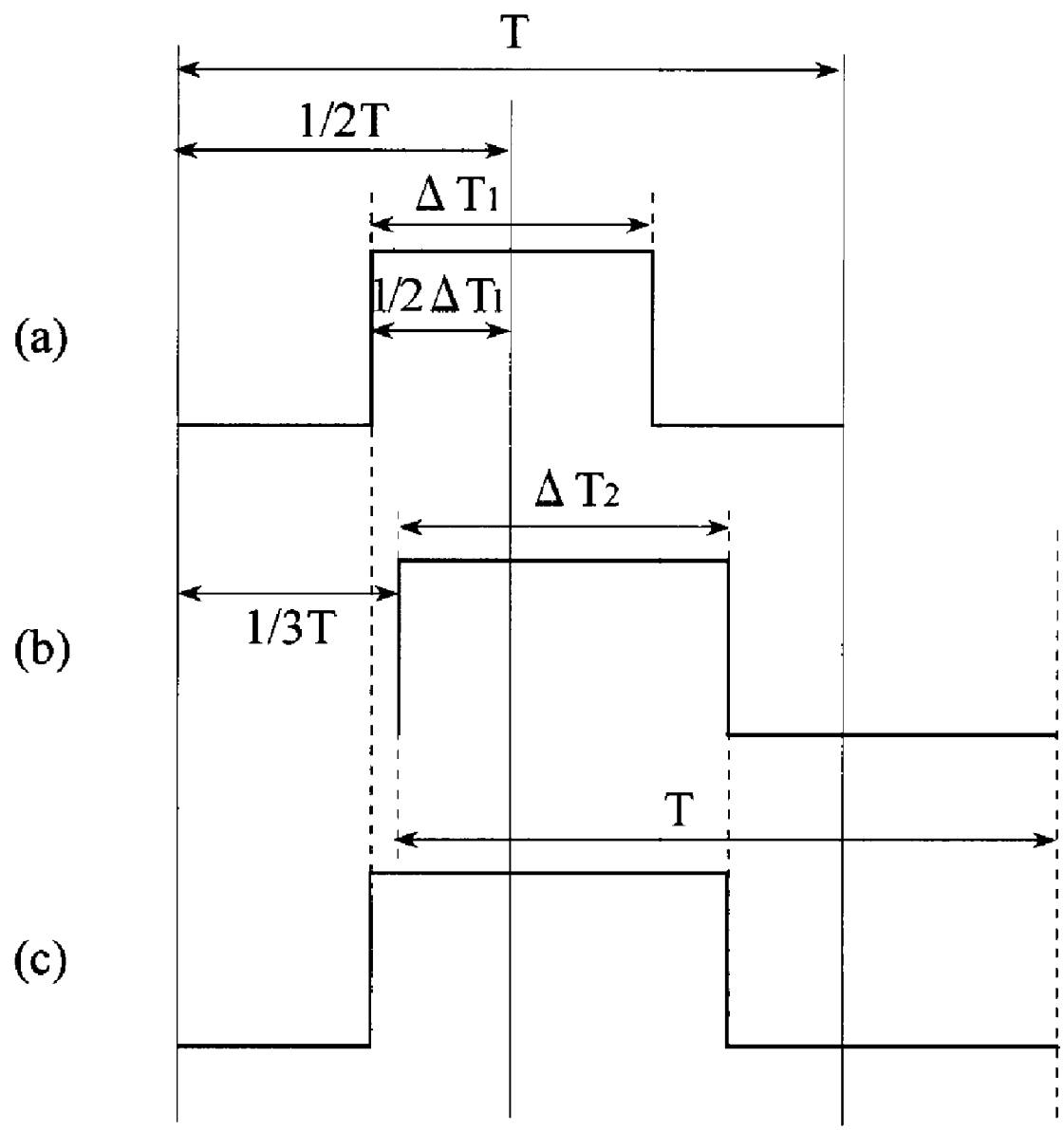
FIG. 10 is a diagram illustrating the output pulse waveform according to a third embodiment.

FIG. 10 is a diagram illustrating when the calculation of the second on-time $\Delta T_2$ is performed at a predetermined timing since the calculation of the first on-time $\Delta T_1$ (hereinafter referred to as the "third embodiment").

FIG. 10(a) shows a first pulse waveform having an on-duration of the first on-time $\Delta T_1$ in which the pulse waveform is such that the on-duration is located in the middle of one period. This first pulse waveform comes on after the elapse of the time $(1/2) \cdot (T-\Delta T_1)$ since the time instant at which the first on-time $\Delta T_1$ was computed (the time instant at the start of the period T of the first pulse waveform), and goes off after the elapse of the time $(1/2) \cdot (T+\Delta T_1)$.

In this example, the second on-time $\Delta T_2$ is computed for when T is used as one period after the elapse of the time $(1/3) \cdot T$ since the time instant at the start of the period T of the first pulse waveform. FIG. 10(b) shows a second pulse waveform having an on-duration of the second on-time $\Delta T_2$. This second pulse waveform comes on at the time instant at which the second on-time $\Delta T_2$ was computed, and goes off after the elapse of the time $\Delta T_2$. The inverter controller 4 outputs an output pulse waveform in which the above two pulse waveforms are combined (see FIG. 10(c)). This output pulse waveform is a pulse waveform that comes on after the elapse of the time $(1/2) \cdot T-(T-\Delta T_1)$ since the time instant at which the first on-time $\Delta T_1$ was computed (the time instant at the start of one period T of the first pulse waveform), and goes off after the elapse of the time $\{(1/3) \cdot T+\Delta T_2\}$, and in which the on-time is $\{-(1/6) \cdot T+(1/2) \cdot \Delta T_1+\Delta T_2\}$.

As is clear from FIG. 10(c), the period of this output pulse waveform is $(4/3) \cdot T$ $(=(1/3) \cdot T+T)$. If the second on-time $\Delta T_2$ is longer than $(2/3) \cdot T$, that is, if the second pulse waveform is at the high level at the end point of the period T of the first pulse waveform, then the second on-time $\Delta T_2$ is computed again just as in the first embodiment, and the period of the output pulse waveform is further extended.

If the timing at which the second on-time $\Delta T_2$ is computed is a time instant that is beyond the elapse of the time $(1/2) \cdot T$ since the time instant at which the first on-time $\Delta T_1$ was computed (the time instant at the start of the period T of the first pulse waveform), there is a problem in that the on-duration of the first pulse waveform ends at the time instant at the start of the on-duration of the second pulse waveform. To avoid this problem, the timing at which the second on-time $\Delta T_2$ is computed should be close to the time instant after the elapse of the time $(1/2) \cdot T$ since the time instant at which the first on-time $\Delta T_1$ was computed.

Again in the third embodiment, the period of the output pulse waveform can be extended. However, since the calculation period for the first on-time $\Delta T_1$ and the second on-time $\Delta T_2$ for extending the period is not constant, control accuracy is not as good as in the first embodiment. Therefore, the timing at which the second on-time $\Delta T_2$ is computed is preferably after the elapse of the time $(\frac{1}{2}) \cdot T$ since the calculation of the first on-time.

Also, the constitution may be such that the first pulse waveform is generated as a pulse waveform in which the on-duration is shifted from the middle, and the calculation of the second on-time $\Delta T_2$ is performed at the timing of the middle location of the on-duration of the first pulse waveform.

Figure 11:
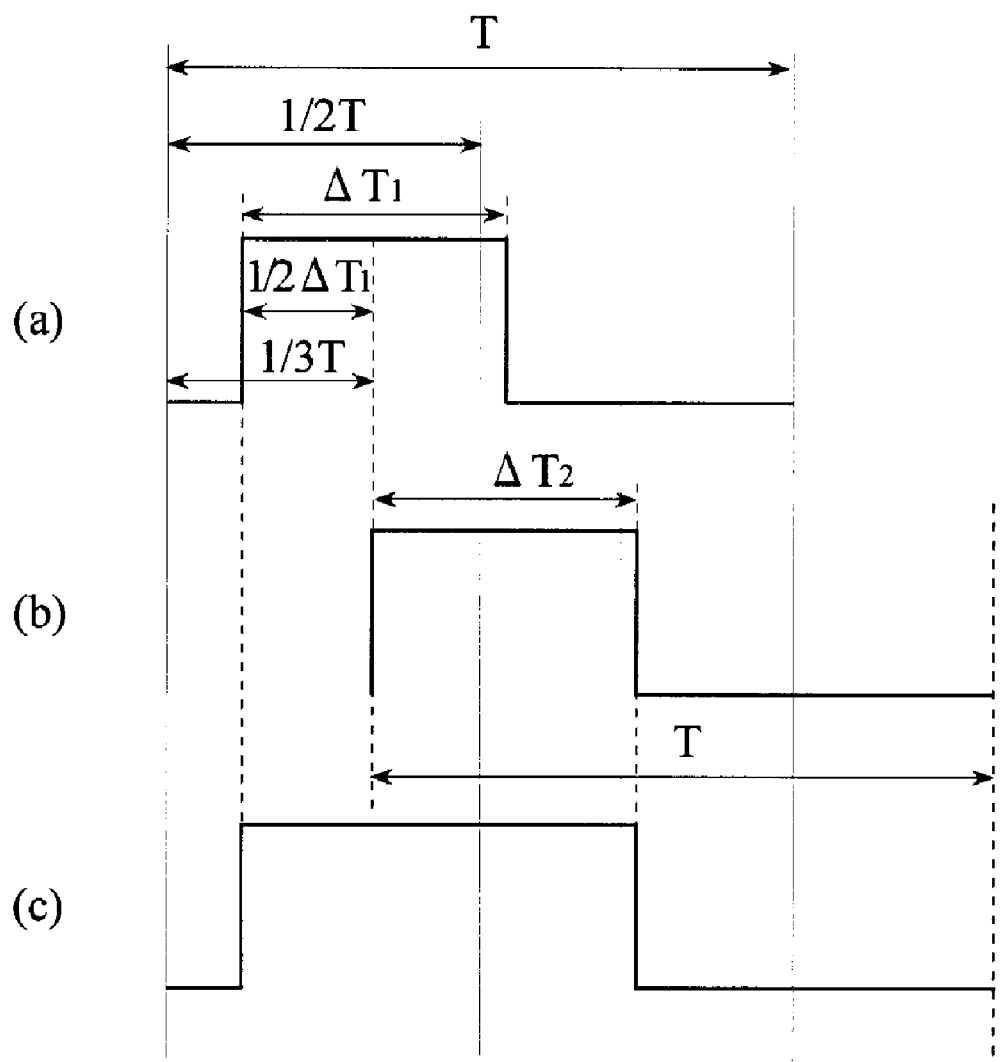
FIG. 11 is a diagram illustrating the output pulse waveform according to a fourth embodiment.

FIG. 11 is a diagram illustrating this constitution (hereinafter referred to as the "fourth embodiment").

FIG. 11(a) shows a first pulse waveform generated such that the location of the on-duration of the first on-time $\Delta T_1$ is shifted from the middle, and is an example of a pulse waveform in which the middle of the on-duration is located at $(\frac{1}{3}) \cdot T$. This first pulse waveform comes on after the elapse of the time $\{(1/3) \cdot T - (\frac{1}{2}) \cdot \Delta T_1\}$ from the time instant at which the first on-time $\Delta T_1$ was computed (the time instant at the start of one period T), and goes off after the elapse of the time $\{(\frac{1}{3}) \cdot T + (\frac{1}{2}) \cdot \Delta T_1\}$.

In this example, the second on-time $\Delta T_2$ is computed for when T is one period after the elapse of the time $(\frac{1}{3}) \cdot T$ since the time instant at the start of the period T of the first pulse waveform. FIG. 11(b) is a second pulse waveform having an on-duration of the second on-time $\Delta T_2$. This second pulse waveform comes on at the time instant at which the second on-time $\Delta T_2$ was calculated, and goes off after the elapse of the time $\Delta T_2$. The inverter controller 4 outputs an output pulse waveform in which the above two pulse waveforms are combined (see FIG. 11(c)). This output pulse waveform is a pulse waveform that comes on after the elapse of the time $\{(\frac{1}{3}) \cdot T - (\frac{1}{2}) \cdot \Delta T_1\}$ since the time instant at which the first on-time $\Delta T_1$ was computed (the time instant at the start of one period T of the first pulse waveform), and goes off after the elapse of the time $\{(\frac{1}{3}) \cdot T + \Delta T_2\}$, and in which the on-time is $\{(\frac{1}{2}) \cdot \Delta T_1 + \Delta T_2\}$.

As is clear from FIG. 11(c), the period of this output pulse waveform is $(\frac{4}{3}) \cdot T (= (\frac{1}{3}) - T + T)$. If the second on-time $\Delta T_2$ is longer than $(\frac{2}{3}) \cdot T$, that is, if the second pulse waveform is at the high level at the end point of the period T of the first pulse waveform, then the second on-time $\Delta T_2$ is computed again just as in the first embodiment, and the period of the output pulse waveform is further extended.

The fourth embodiment is similar to the second embodiment in terms of avoiding having the location of the on-duration of the first pulse waveform be near the leading edge side of one period. Also, the period of the output pulse waveform can be extended in the fourth embodiment as well, but since this embodiment is the same as the third embodiment in that the calculation period for the first on-time $\Delta T_1$ and the second on-time $\Delta T_2$ is not constant, control accuracy is not as good as in the first embodiment. Therefore, taking all of this into account, it is also preferable in the fourth embodiment if the first pulse waveform is generated as a pulse waveform in which the on-duration is located in the middle of one period.

In the fourth embodiment, rather than performing the calculation of the second on-time $\Delta T_2$ at the timing of the middle location of the on-duration of the first pulse waveform, the timing may be at any point from the start of the period of the first pulse waveform.

Figure 12:
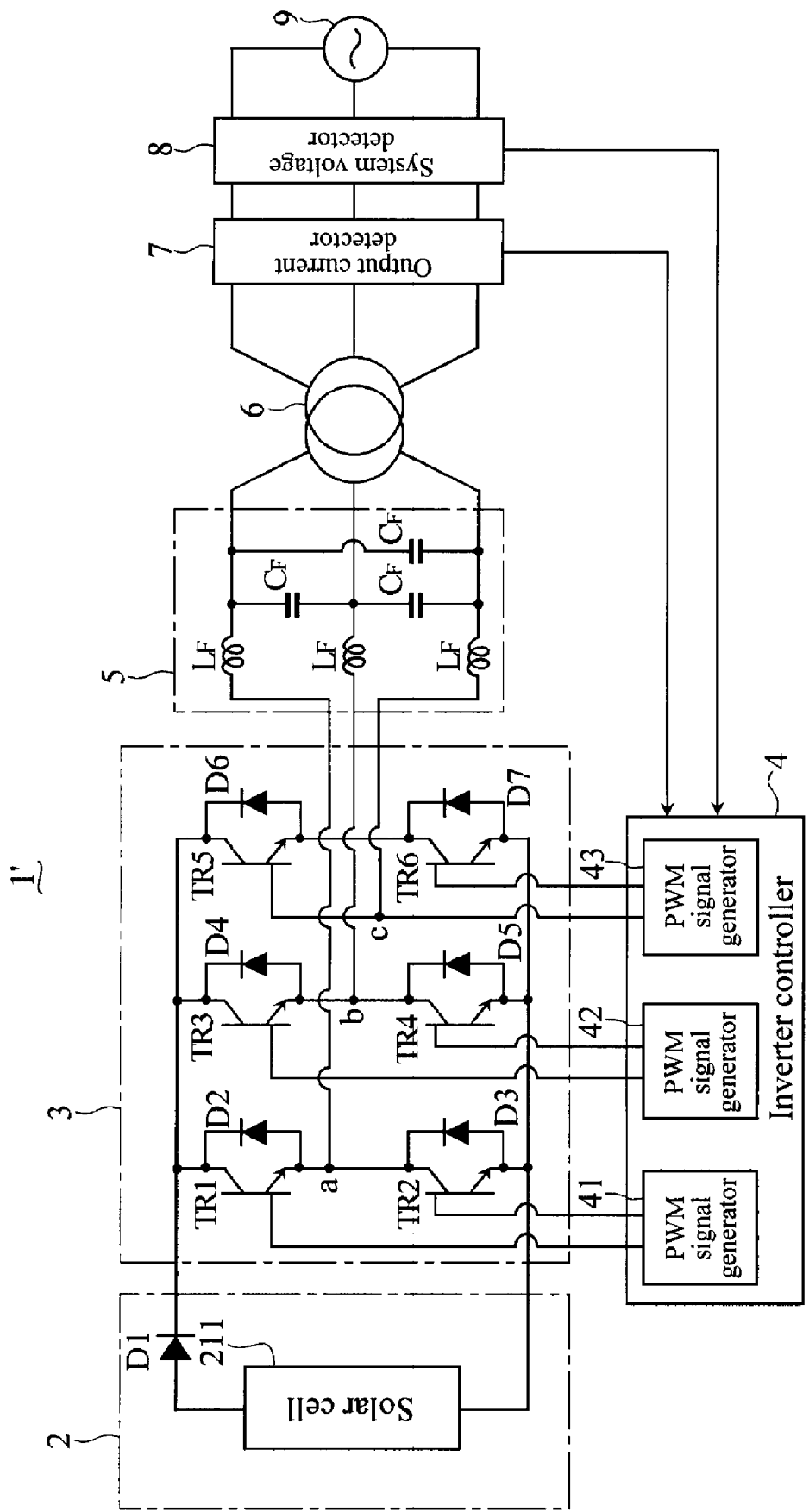

For the sake of convenience, a single-phase system-linked inverter device was described in the above embodiments, but it should go without saying that the present invention can also be applied to the three-phase inverter device 1' shown in FIG. 12.

In FIG. 12, circuits that perform the same function as in the inverter device 1 in FIG. 1 are numbered the same. The inverter circuit 3 is provided with a third arm composed of serially connected switching elements TR5 and TR6 in addition to the first and second arms. Output lines of U-phase, V-phase, and W-phase output voltage are outputted from the respective connection points a, b, and c of the first, second, and third arms. Inductors $L_F$ are serially connected to the three output lines, and capacitors $C_F$ are connected between these output lines. Low-pass filters of the U-phase, V-phase, and W-phase output lines are constituted by inverted L-shaped connections of the inductors $L_F$ and capacitors $C_F$ between the output lines. Therefore, the filter circuit 5 has three low-pass filters corresponding to U-phase, V-phase, and W-phase.

Similarly, the output current detector 7 and the system voltage detector 8 each comprise three detectors, with U-phase, V-phase, and W-phase output current being detected by the respective detectors, and these detection values are inputted to the inverter controller 4.

The inverter controller 4 is equipped with three PWM signal generators 41, 42, and 43 corresponding to the first, second, and third arms. Specifically, the inverter controller 4 is equipped with three PWM signal generators 41, 42, and 43 for generating PWM signals used to control U-phase, V-phase, and W-phase output current. The three PWM signals outputted from the PWM signal generators 41, 42, and 43 are identical except that their phases are offset by 120 degrees each. Therefore, the specific function blocks of the PWM signal generators 41, 42, and 43 are the same as those shown in FIG. 6, and the inverter controller 4 will not be described again in detail.

Again with the three-phase inverter device 1', just as with the inverter device 1 in the above embodiments, the inverter controller 4 generates PWM signals in which the periods of the pulses have been extended. Therefore, the number of times the switching elements TR1 to TR6 of the inverter device 1' have to be switched is reduced and there is less switching loss, so the voltage conversion efficiency can be improved.

Figure 13:
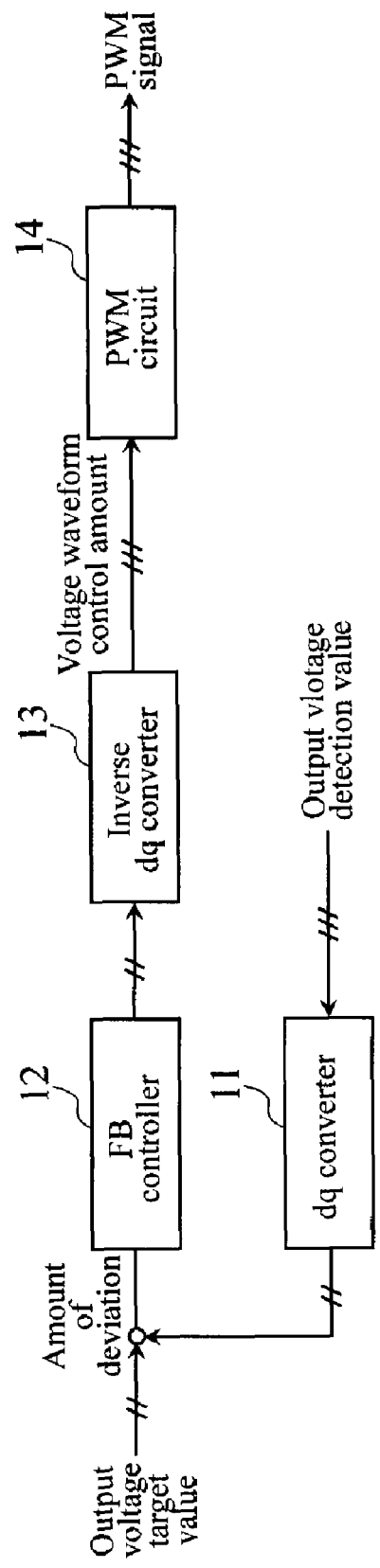
FIG. 13 is a block diagram of the basic configuration of the PWM signal generation component of a conventional three-phase inverter device.

In general, as shown in the block diagram of FIG. 13 of the PWM signal generators subjected to feedback control, the PWM signal generators of this three-phase inverter device 1' have a dq converter 11, an FB controller 12, and an inverse dq converter 13, and comprise a function of converting triple-phase into dual-phase and generating a control signal on the dq axis. With the PWM signal generator shown in FIG. 13, detection values $V_U$, $V_V$, and $V_W$ of the U-phase, V-phase, and W-phase output voltage that have undergone feedback are converted into two-phase voltage values $v_d$ and $v_q$ by the dq converter 11 according to the following formula (17), and the FB controller 12 uses the amount of deviation between these voltage values $v_d$ and $v_q$ and control target values $v_{do}$ and $v_{qo}$ to generate control signals $e_d$ and $e_q$. These control signals $e_d$ and $e_q$ are converted by the inverse dq converter 13 into three-phase control signals $e_u$, $e_v$, and $e_w$, and a PWM circuit 14 generates from these control signals $e_u$, $e_v$, and $e_w$ PWM signals for controlling the U-phase, V-phase, and W-phase output currents.

[E11]

$$\begin{bmatrix} V_d \\ V_q \end{bmatrix} = \begin{bmatrix} \cos\omega t & \sin\omega t \\ -\sin\omega t & \cos\omega t \end{bmatrix} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} V_u \\ V_v \\ V_w \end{bmatrix} \quad (17)$$

Figure 14:
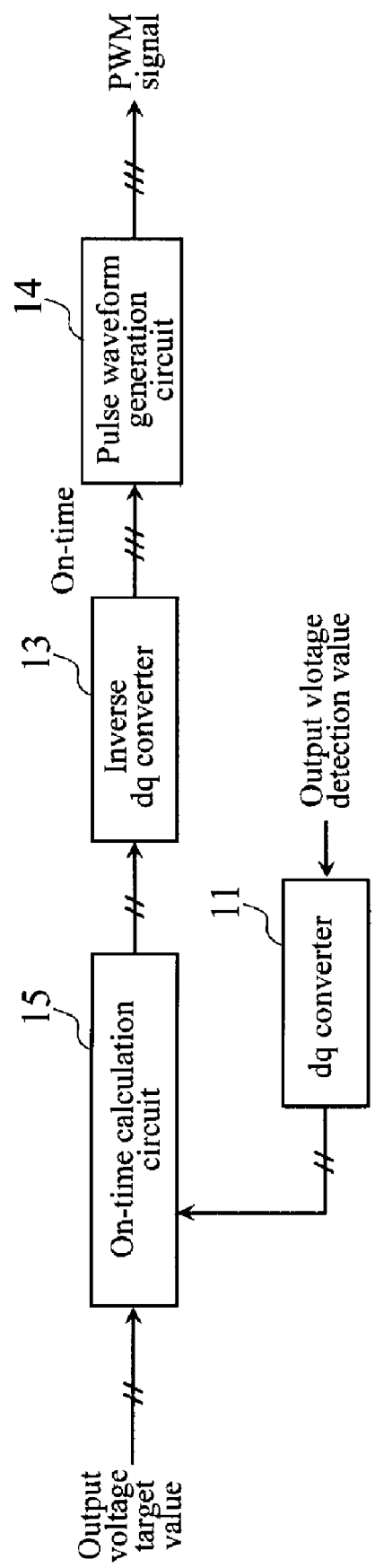
FIG. 14 is a block diagram of the basic configuration of the PWM signal generation component of the three-phase inverter device according to the present invention.

With the three-phase inverter device 1' pertaining to the present invention, since calculation processing for generating PWM signals can also be performed on the dq axis, the block diagram corresponding to FIG. 13 becomes FIG. 14. In FIG. 14, an on-time calculation circuit 15 and a pulse waveform generation circuit 16 correspond to the overall function block diagram of the inverter controller 4 in FIG. 6, and the calculated two-phase on-times $\Delta T_d$ and $\Delta T_q$ are converted by the inverse dq converter 13 into three-phase on-times $\Delta T_u$, $\Delta T_v$, and $\Delta T_w$.

Again with the three-phase inverter device 1' pertaining to the present invention, the control target values for output current can be inputted as control target values on the dq axis, so the concept of dq conversion can be applied to the three-phase inverter device pertaining to the present invention just as with a conventional three-phase inverter device. Furthermore, since the modeling error that occurs in making output voltage discrete is suppressed by converting the basic wave component of the control signal into a DC component by using dq conversion, less error can be achieved with systems having a long switching period.

With the embodiments above, the description was of a system-linked inverter device in which the system was the load, but the present invention can also be applied to an inverter device for supplying AC power to a load other than a system, such as an inverter device used for motor drive. However, the present invention functions more effectively when the need for higher efficiency is given more emphasis than higher accuracy or faster response.

Also, the PWM signal generator of the present invention is not limited to an inverter device, and can also be applied to a system where the effect is to lengthen as much as possible the period of inputted PWM signals under set conditions.

Also, with the embodiments above, the description was of a case of using the PWM signal generator of the present invention in a system-linked inverter device, but the PWM signal generator of the present invention may instead be realized by having a computer read a program, for generating PWM signals by the above-mentioned method in a conventional PWM signal generator, from a ROM or other such recording medium to which said program has been recorded in computer-readable fashion, and then executing that program.

The invention claimed is:

1. A PWM signal generator, comprising:
   a first pulse waveform generator for generating a first pulse waveform having a first pulse period, a first waveform type, and a high-level duration, the high-level duration having a length of a first on-time and being located at a first location in the first pulse period;
   a second pulse waveform generator for generating a second pulse waveform having a second pulse period, a second waveform type different from the first waveform type, and a high-level duration, the high-level duration having a length of a second on-time and being located at a second location in the first pulse period; and
   a PWM signal generator for generating a composite pulse waveform by connecting the second pulse waveform with a part of the first pulse waveform, and then generating a PWM signal based on the composite pulse waveform, the composite pulse waveform having a composite pulse period longer than the first pulse period;
   wherein the first pulse waveform generator calculates the first on-time when the first pulse period starts, and then generates the first pulse waveform based on the calculated first on-time and the first location,
   wherein the second pulse waveform generator calculates the second on-time at a predetermined delay time after the first pulse waveform starts to be generated, and then generates the second pulse waveform based on the calculated second on-time and the second location,
   wherein the part of the first pulse waveform connected with the second pulse waveform by the PWM signal generator to generate the composite pulse waveform is the part of the first pulse waveform generated by the first pulse waveform generator when the first pulse period starts to when the delay time expires,
   wherein the first pulse waveform generator generates a next first pulse waveform at an end of the composite pulse waveform.

2. The PWM signal generator according to claim 1, wherein the first waveform type is a shape that becomes a high level in a middle portion of the first pulse period and becomes a low level at both ends of the first pulse period,
   wherein the second waveform type is a shape that becomes a high level in a former part of the second pulse period and becomes a low level in a latter part of the second pulse period, and
   wherein the composite pulse waveform having a composite waveform type that is the same as the first waveform type and a waveform constructed by connecting the second pulse waveform to the high-level duration of the first pulse waveform.

3. The PWM signal generator according to claim 2, wherein the first pulse period is equal to the second pulse period.

4. The PWM signal generator according to claim 2, wherein the high level duration of the first pulse waveform is disposed in a middle of the first pulse period.

5. The PWM signal generator according to claim 4, wherein the delay time satisfies a condition that the generation of the second pulse waveform starts in a duration in which the first pulse waveform generated by the first pulse waveform generator is a high level.

6. The PWM signal generator according to claim 5, wherein the delay time is one-half of the first pulse period.

7. The PWM signal generator according to claim 2, wherein the first pulse waveform generator includes:
   a first on-time calculator for computing, at a start of the first pulse period, the first on-time; and
   a first inversion timing decider for determining a first inversion timing at which a level of the first pulse waveform inverts from a low level to a high level in the first pulse period, based on the first on-time and the first location;
   wherein the second pulse waveform generator includes:
   a second on-time calculator for computing, after a elapse of the delay time after a start of generation of the first pulse waveform, the second on-time; and
   a second inversion timing decider for determining, based on the second on-time, a second inversion timing at which a level of the second pulse waveform inverts from a high level to a low level in the second pulse period in which the second on-time has been computed, and wherein the PWM signal generation means includes:
an inversion timing detector for detecting the first and second inversion timings with reference to a start timing of the first pulse period; and
a PWM signal output unit for setting an output level to the low level at the start of the first pulse period, subsequently inverting the output level to the high level when the first inversion timing is detected, inverting thereafter the output level to the low level when the second inversion timing is detected, thereby generating the composite pulse waveform, for outputting this pulse signal as the various pulses of the PWM signal.

8. The PWM signal generator according to claim 7, wherein the first inversion timing decider determines, as the first inversion timing, a point when a remaining time, obtained by subtracting one-half of the computed first on-time from a time at the middle position of the high level in the first pulse period, has elapsed from a start of calculation of the first on-time, every time the first on-time is computed, and
wherein the second inversion timing determination means determines, as the second inversion timing, a point when the computed second on-time has elapsed from a start of calculation of the second on-time, every time the second on-time is computed.

9. The PWM signal generator according to claim 2, further comprising:
a determiner for determining whether the level of the second pulse waveform is a high level or not, every time the first pulse period ends; and
a pulse waveform regenerator for causing, only when the level of the second pulse waveform at an end of the first pulse period is a high level, the second pulse waveform generator to generate a second pulse waveform again at an end of the first pulse period,
wherein the PWM signal generator generates a PWM signal based on a composite pulse waveform in which the first pulse wave form is combined with the generated second pulse waveform and the regenerated second pulse waveform.

10. The PWM signal generator according to claim 9, further comprising:
a second determiner for determining whether a level of the second pulse waveform regenerated at an end of a period of the previously generated second pulse waveform is a high level or not when the generation of the second pulse waveform is performed again by the pulse waveform regenerator,
wherein the pulse waveform regenerator repeats an operation of causing the second pulse waveform generator to generate a second pulse waveform again at an end of a period of the previously generated second pulse waveform, until a level of the second pulse waveform regenerated at an end of a period of the previously generated second pulse waveform reaches a low level, and
wherein the PWM signal generator generates a PWM signal based on a composite pulse waveform in which the first pulse waveform is combined with the generated second pulse waveform and one or more regenerated second pulse waveforms.

11. The PWM signal generator according to claim 10, wherein the first pulse waveform generator includes:
a first-on time calculator for computing, at a start of the first pulse period, the first on-time; and
a first inversion timing decider for determining a first inversion timing at which a level of the first pulse waveform inverts from a low level to a high level in the first pulse period based on the first on-time and the first location,
wherein the second pulse waveform generator includes:
a second on-time calculator for computing a second on-time, after a elapse of the delay time from a start of generation of the first pulse waveform, and if a generation of the second pulse waveform is performed again by the pulse waveform regenerator, at an end of the first pulse period and at an end of the period of the previously generated second pulse waveform; and
a second inversion timing decider for determining, based on the second on-time that has been last computed by the second on-time calculator, a second inversion timing at which a level of the second pulse waveform inverts from a high level to a low level in the second pulse period in which the second on-time has been computed, and
wherein the PWM signal generator includes:
an inversion timing detector for detecting the first and second inversion timings with reference to a start time of the first pulse period; and
a PWM signal output unit for setting an output level to a low level at a start of the first pulse period, subsequently inverting the output level to the high level when the first inversion timing is detected, holding the output level at the high level on the basis of the one or more generated second pulse waveforms, subsequently inverting the output level to the low level when the second inversion timing is detected, thereby generating a composite pulse waveform in which the first pulse waveform and the one or more second pulse waveform are combined, for outputting this pulse signal as the various pulses of the PWM signal.

12. The PWM signal generator according to claim 11, wherein the first inversion timing decider determines, as the first inversion timing, a point when the remaining time, obtained by subtracting one-half of the computed first on-time from the time at the middle position of the high level in the first pulse period, has elapsed from the start of calculation of the first on-time, every time the first on-time is computed, and
wherein the second inversion timing decider determines, as the second inversion timing, a point when the second on-time last computed has elapsed from the start of the last calculation of the second on-time.

13. The PWM signal generator according to claim 7, wherein the first on-time calculator computes the first on-time by using a first calculation formula for finding a solution to a first state equation in which an input variable is the first on-time of the first pulse waveform and which is derived from a state equation in which a state variable inputted to a control object is the first pulse waveform, and
wherein the second on-time calculator computes the second on-time by using a second calculation formula for finding a solution to a second state equation in which an input variable is the second on-time of the second pulse waveform and which is derived from a state equation in which the state variable inputted to the control object is the second pulse waveform.

14. An inverter device, comprising:
a DC power supply that outputs DC voltage;
a bridge circuit which inversely converts the DC voltage outputted from the DC power supply into AC voltage, and in which a plurality of switching elements are bridge-connected;
a control circuit that controls the inverse conversion operation of the bridge circuit by controlling an on/off operation of the plurality of switching elements;

a filter circuit that removes switching noise included in the AC voltage outputted from the bridge circuit; and a transformer that receives the AC voltage outputted from the filter circuit for applying a transformed voltage to a load, wherein the control circuit includes the PWM signal generator according to claim 7, and controls an on/off operation of the plurality of switching elements by means of PWM signals generated by the PWM signal generator.

15. The inverter device according to claim 14, wherein the DC power supply comprises a solar cell, the bridge circuit comprises a three-phase bridge circuit, and the AC voltage outputted from the transformer is three-phase AC voltage outputted in connection with a commercial power system.

* * * * *